US011332245B2

(12) United States Patent
Mohseni et al.

(10) Patent No.: US 11,332,245 B2
(45) Date of Patent: May 17, 2022

(54) SLIDING, CANTED, CONTROL SURFACES FOR CONTROL AUGMENTATION OF LIFTING SURFACES AT HIGH ANGLES OF ATTACK

(71) Applicant: University of Florida Research Foundation, Incorporated, Gainesville, FL (US)

(72) Inventors: Kamran Mohseni, Gainesville, FL (US); Thomas I. Linehan, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 239 days.

(21) Appl. No.: 16/709,227

(22) Filed: Dec. 10, 2019

(65) Prior Publication Data
US 2020/0247538 A1 Aug. 6, 2020

Related U.S. Application Data

(60) Provisional application No. 62/783,698, filed on Dec. 21, 2018.

(51) Int. Cl.
*B64C 9/22* (2006.01)
*B64C 23/06* (2006.01)
(Continued)

(52) U.S. Cl.
CPC ............ *B64C 39/028* (2013.01); *B64C 9/08* (2013.01); *B64C 9/22* (2013.01); *B64C 23/06* (2013.01)

(58) Field of Classification Search
CPC .... B64C 9/04; B64C 9/08; B64C 9/22; B64C 9/24; B64C 23/06
See application file for complete search history.

(56) References Cited

U.S. PATENT DOCUMENTS 1,438,242 A * 12/1922 Holle ...................... B64C 13/00
244/214
1,775,977 A * 9/1930 Thurston ................... B64C 9/18
244/82

(Continued)

OTHER PUBLICATIONS

Brown, Richard E. et al. *Airflow Sensors in the Avian Wing*. Journal of Experimental Biology, vol. 170, No. 1, pp. 13-30, (1993).
(Continued)

*Primary Examiner* — Joseph W Sanderson
(74) *Attorney, Agent, or Firm* — Alston & Bird LLP

(57) ABSTRACT

A vehicle, such as a micro-aerial vehicle or underwater vehicle, includes at least one lift structure, such as a low-aspect-ratio wing or a fin, respectively. The at least one lift structure comprises one or more alulas. A leading surface of each alula is (a) flush with a leading surface of the lift structure or (b) offset from the leading edge of the lift surface by up to approximately 10% of the chord length of the lift structure. The length of each alula is no more than approximately 20% of a lift structure length corresponding to the lift structure. In various embodiments, the alula is deflected or canted with respect to a plane defined by the lift structure. In an example embodiment, the alulas may be slid or translated along at least a portion of the span of the lift structure.

20 Claims, 22 Drawing Sheets

(51) Int. Cl.
   *B64C 9/08* (2006.01)
   *B64C 39/02* (2006.01)

(56) References Cited

U.S. PATENT DOCUMENTS

| | | | | |
|---|---|---|---|---|
| 1,798,913 A * | 3/1931 | Thurston | B64C 21/02 | 244/210 |
| 1,798,915 A * | 3/1931 | Thurston | B64C 21/02 | 244/210 |
| 1,827,304 A * | 10/1931 | Thurston | B64C 13/00 | 244/82 |
| 1,862,421 A * | 6/1932 | O'Malley | B64C 9/04 | 244/214 |
| 1,936,179 A * | 11/1933 | Thurston | B64C 23/02 | 244/198 |
| 2,049,188 A * | 7/1936 | Alfaro | B64C 9/04 | 244/211 |
| 9,789,956 B2 * | 10/2017 | Bordoley | B64C 13/02 | |
| 2013/0345910 A1 * | 12/2013 | Kerho | B64D 43/02 | 701/14 |
| 2016/0083083 A1 * | 3/2016 | Bordoley | B64C 21/10 | 244/200.1 |
| 2020/0001973 A1 * | 1/2020 | Bushmire | B64C 29/0033 | |

OTHER PUBLICATIONS

Videler, John. *Avian Flight*, Oxford University Press, (2005), (275 pages), Oxford, NY, USA.

Carruthers, Anna C. et al. *Automatic Aeroelastic Devices in the Wings of a Steppe Eagle Aquila Nipalensis*, The Journal of Experimental Biology, vol. 210, p. 4136-4149, (2007). DOI: 10.1242/jeb.011197.

Ákvarezm, J. C. et al. *On the Role of the Alula in the Steady Flight of Birds*, Ardeola, vol. 48, No. 2, (2001), pp. 161-173. DOI: 10.1038/srep09914.

Meseguer, J. et al. *On the Aerodynamics of Leading-Edge High-Lift Devices of Avian Wings*, Proceedings of the Institution of Mechanical Engineers, Part G: Journal of Aerospace Engineering, col. 219, No. 1, (2005), pp. 63-68. DOI: 10.1243/095441005X9067.

Austin, Bridget et al. *The Alula and Its Aerodynamic Effect on Avian Flight*, In Proceedings of the ASME International Mechanical Engineering Congress and Exposition, (2007), pp. 797-806, Seattle, Washington, USA. DOI: 10.1115/IMECE2007-41693.

Lee, Sang-im et al. *The Function of the Alula in Avian Flight*, Scientific Reports, vol. 5, No. 1, pp. 1-5, May 7, 2015. DOI: 10.1038/srep09914.

Lee, Sang-im et al. *Characteristics of the Alula in Relation to Wing and Body Size in the Laridae and Sternidae*, Animal Cells and Systems, vol. 21, No. 1, pp. 63-69, Dec. 16, 2016. DOI: 10.1080/19768354.2016.1266287.

Mandadzhiev, Boris A. et al. *An Experimental Study of an Airfoil With a Bio-Inspired Leading Edge Device at High Angles of Attack*, Smart Materials and Structures, vol. 26, 094008, pp. 1-18, (2017). DOI: 10.1088/1361-665x/aa7ded.

Ito, Mihary R. et al. *A Leading-Edge Alula-Inspired Device (Lead) for Stall Mitigation and Lift Enhancement for Low Reynolds Number Finite Wings*, Proceedings of the ASME 2018, Conference on Smart Materials, Adaptive Structures and Intelligent Systems, SMASIS2018-8170, Sep. 10-12, 2018, pp. 1-9, Seattle, Washington, USA. DOI: 10.1115/IMECE2007-41693.

Sander, Aljoscha. *The Role of the Alula in Avian Flight and It's Application to Small Aircraft: A Numerical Study*, Master's Thesis, University of Groningen, (2018), (104 pages), Groningen, Netherlands.

Ito, Mihary R. et al. *The Function of the Alula on Engineered Wings: A Detailed Experimental Investigation of a Bioinspired Leading-Edge Device*, Bioinspiration & Biomimetics, vol. 14, 056015, (2019), pp. 1-15. DOI: 10.1088/1748-3190/ab36ad.

Linehan, Thomas et al. *Investigation of a Sliding Alula for Control Augmentation of Lifting Surfaces at High Anglesof Attack*, Aerospace Science and Technology, vol. 87, (2019), pp. 73-88. DOI:10.1016/j.ast.2019.02.008.

* cited by examiner

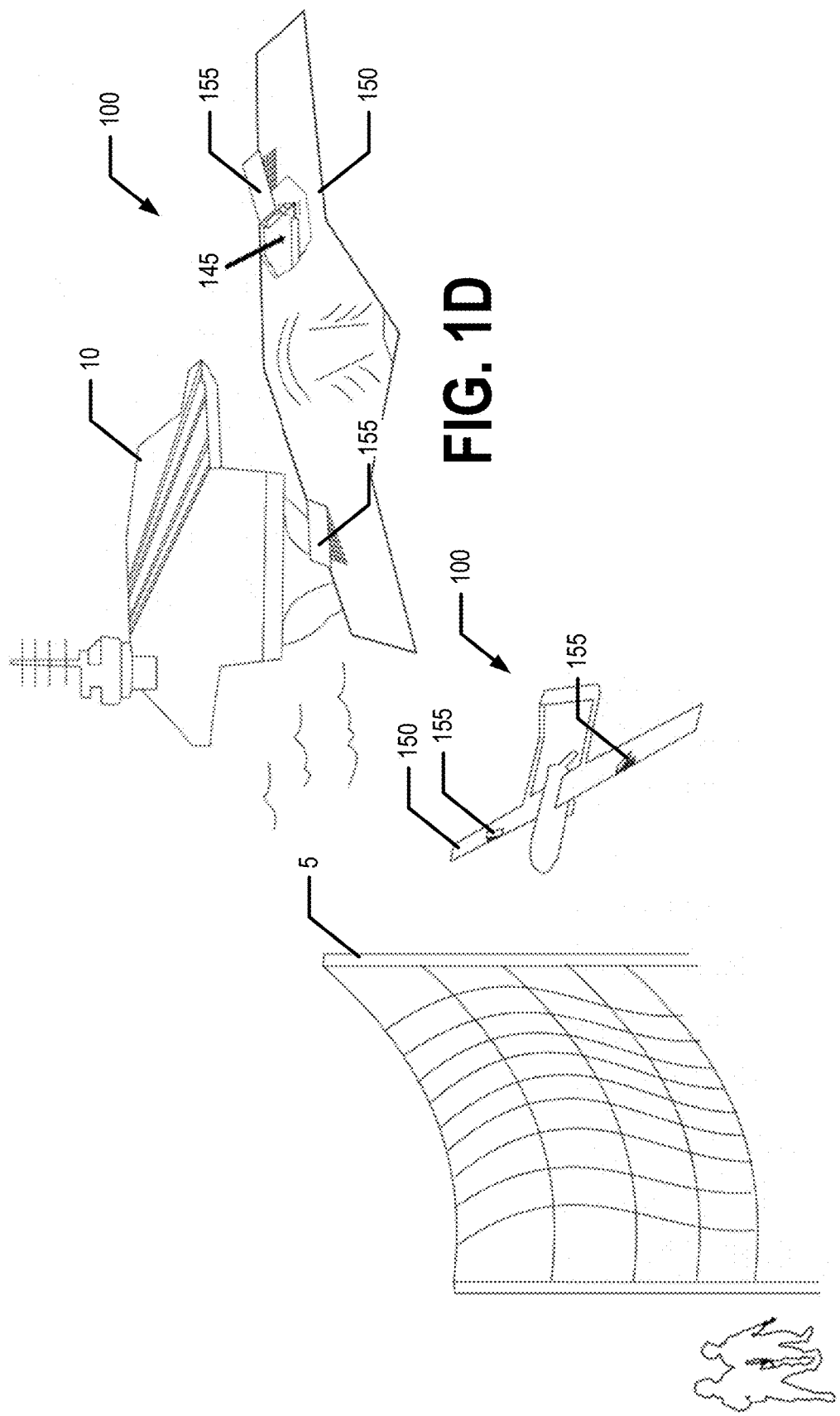

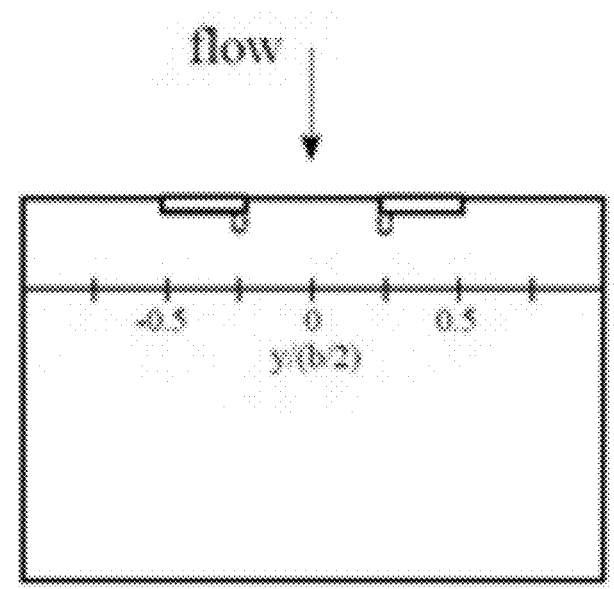
FIG. 8A
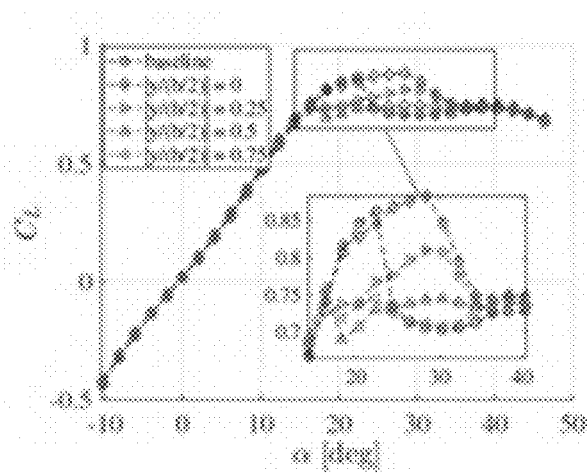 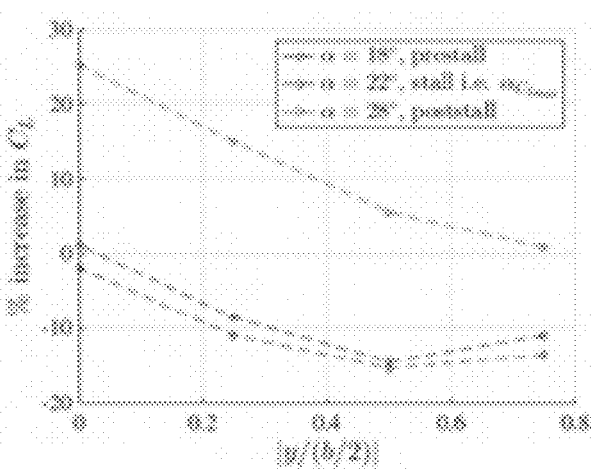
FIG. 8B  FIG. 8C

Lift coefficient

Roll moment coefficient

Lift coefficient

Roll moment coefficient

Lift coefficient

Roll moment coefficient

Lift coefficient

Roll moment coefficient

FIG. 15A
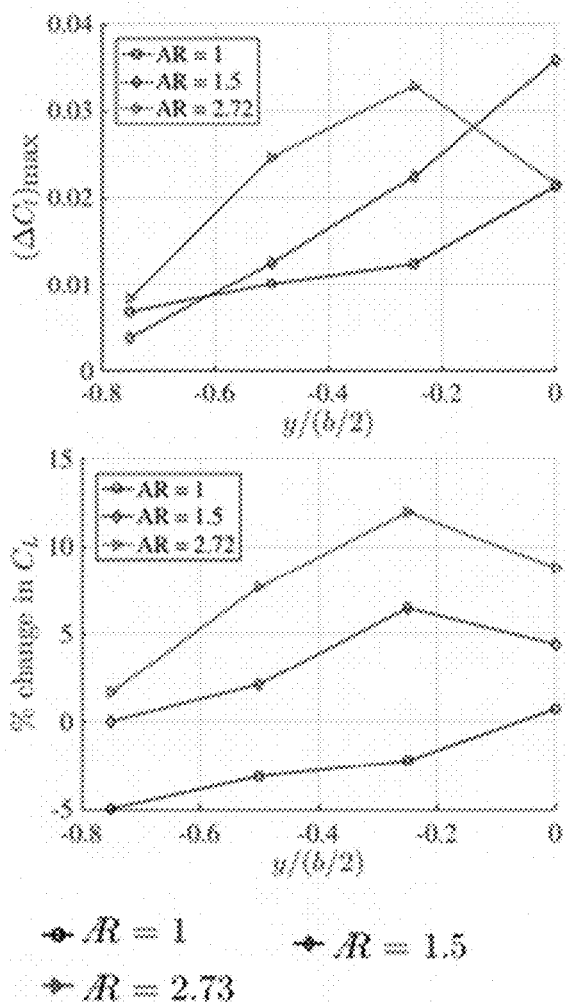
FIG. 15B
FIG. 16A
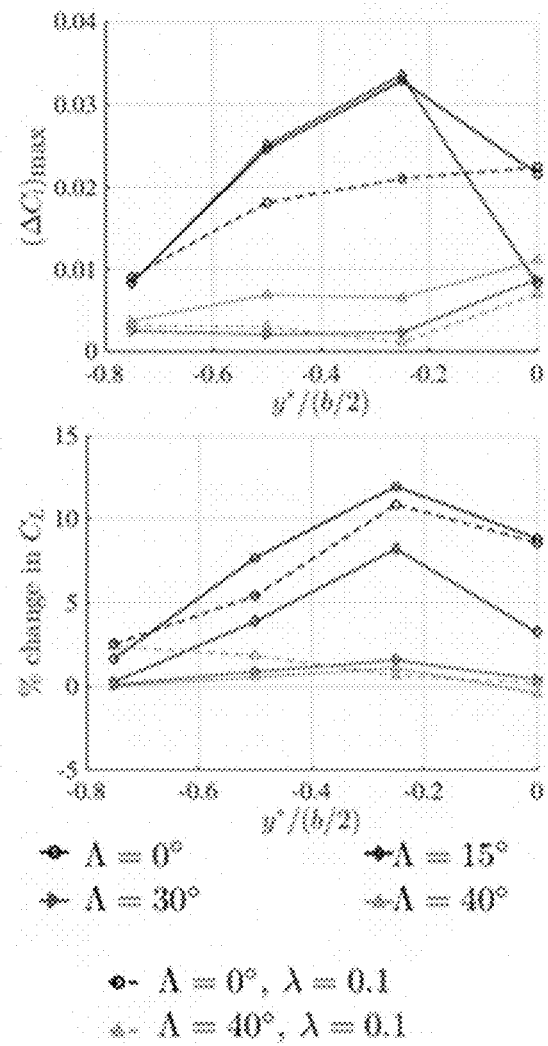
FIG. 16B

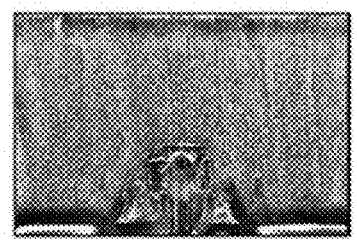 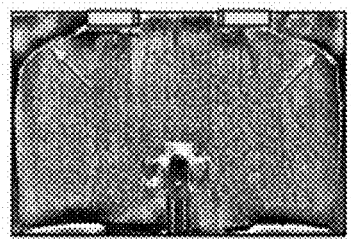 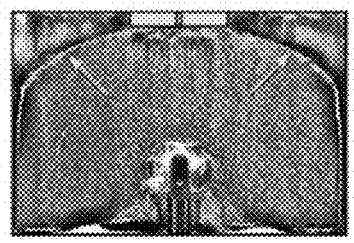
FIG. 21A  FIG. 21B  FIG. 21C
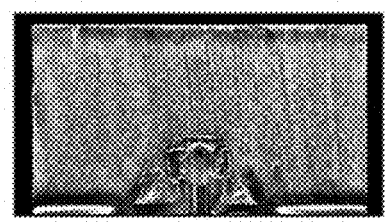 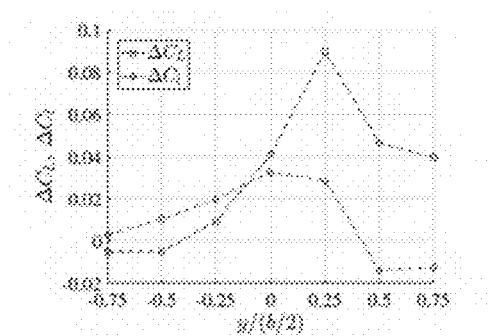
(A)
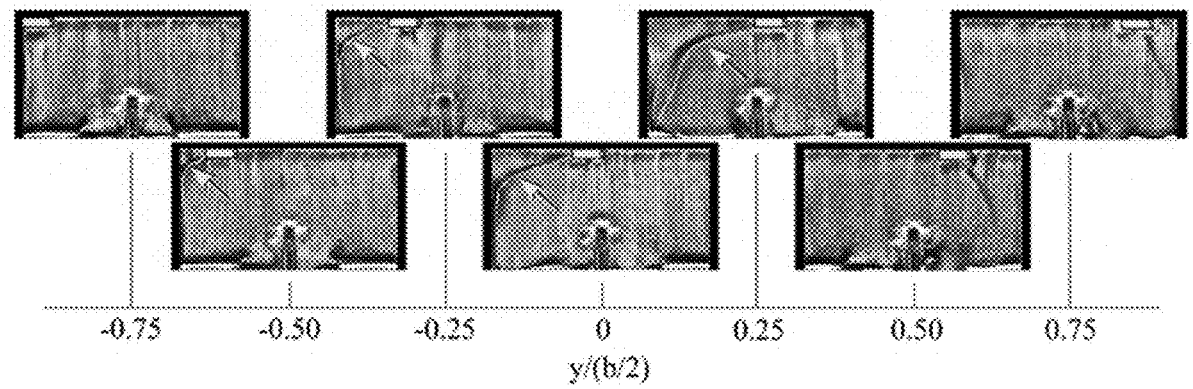
FIG. 22

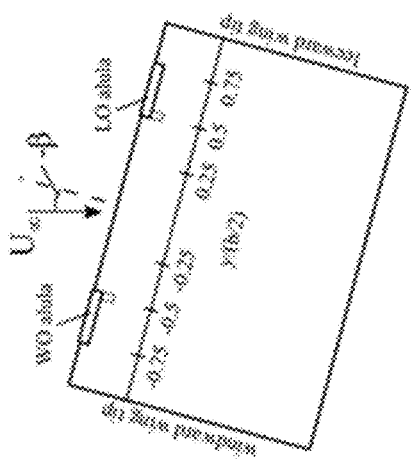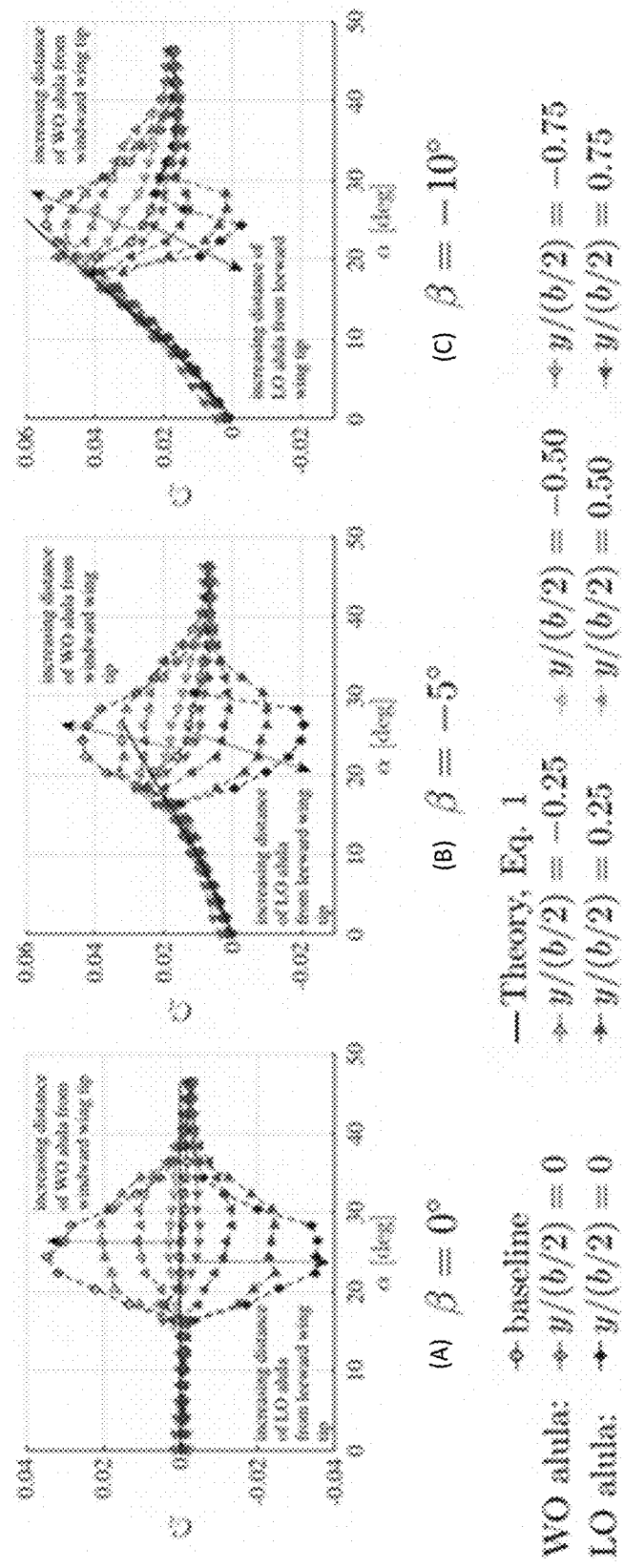
FIG. 24

SLIDING, CANTED, CONTROL SURFACES FOR CONTROL AUGMENTATION OF LIFTING SURFACES AT HIGH ANGLES OF ATTACK

CROSS-REFERENCE TO RELATED APPLICATIONS

This application claims priority to U.S. application Ser. No. 62/783,698, filed Dec. 21, 2018, the content of which is hereby incorporated by reference in its entirety.

FEDERALLY SPONSORED RESEARCH OR DEVELOPMENT

This invention was made with government support under FA9550-17-1-0176 awarded by U.S. Air Force Office of Scientific Research (AFOSR) and 1805776 awarded by the National Science Foundation. The government has certain rights in the invention.

BACKGROUND

Lifting surfaces are found in a variety of applications ranging from the wings of aircraft to the fins of underwater vehicles. For tasks requiring precision maneuvering at low speeds (e.g. takeoff and landing, surveillance, underwater maneuvering, etc.), often the forces and moments generated by lifting surfaces need to be controlled while the lifting surface is operated at a high angle of attack.

Control augmentation of lifting surfaces at high angles of attack is particularly challenging due to boundary layer separation which can result in stalled flow over traditionally mounted and actuated control surfaces. The reduction in roll moment as produced by a −20° trailing-edge flap aileron deflection on several rectangular wings of varying aspect ratio (AR) is evinced in FIG. 2. The Reynolds number for these experiments was Re=O($10^6$) as described in Fischel, J., Naeseth, R. L., Hagerman, J. R., and O'Hare, W. M., "Effect of aspect ratio on the low-speed lateral control characteristics of untapered low-aspect-ratio wings equipped with trailing-edge flap ailerons," NACA TN 1091, National Advisory Committee for Aeronautics, Langley Aeronautical Lab, Langley Field, Va., USA, 1952. The arrows in FIG. 2 mark the approximate angle of attack of maximum lift as an indicator of leading-edge flow separation and subsequent lift stall. For the AR=2.13 and AR=4.13 wings, a precipitous loss in control power follows lift stall. Due to highly three-dimensional flow over low-aspect-ratio wings, the aileron on the AR=1.13 experiences a loss of control authority at angles of attack of increasing lift, at an angle of attack well before that of stall. Collectively, the reduction in control forces due to a flap-aileron at high angles of attack will reduce the low-speed manueverability of any air or underwater vehicle that relies on control forces and moments produced by lifting surfaces.

There exists a variety of solutions to overcome this control problem including, but not limited to, flow control (blowing, suction, synthetic jet, plasma actuation) and leading-edge flaps. However, for applications with stringent cost, weight, size, and power requirements these control solutions may be inappropriate. For example, flow control solutions tend to be costly and bulky due to the need for external reservoirs/power sources. Furthermore, flow control systems cannot be easily incorporated into existing designs. Leading-edge flaps, which tend to incorporate relatively simpler actuation mechanisms, tend to span large portions of the lifting surface and therefore require significant energy expenditure to both deploy and actuate. In addition, the storage of leading-edge flaps can reduce the efficiency of the lifting surface during off-design conditions. Consequently, there exists a need for low cost, lightweight, low power, and minimally intrusive high angle of attack control augmentation solutions.

BRIEF SUMMARY

Generating control forces on lifting surfaces at high angles of attack is particularly challenging due to boundary layer separation. Certain applications, such as Micro-Aerial Vehicles (MAVs), have stringent control requirements in terms of weight and power which have propelled investigation into unconventional control solutions. Various embodiments provide a vehicle comprising a lift structure and/or a lift structure comprising a high-angle-of-attack control effector that is modeled after a bird's alula, or bastard wing, and mimics a miniature, canted, control surface located at the leading edge of the wing, which is referred to herein as an alula. As used herein, an alula is a miniature (compared to the wing to which the alula is secured), canted, control surface located on the leading edge of the wing. In various embodiments, the shape of the lift structure may vary among various embodiments. In various embodiments, the lift structure comprises low-aspect-ratio wings affixed with one or more alulas. As should be understood, the aspect ratio of a wing or lift structure is the ratio of the span of the wing or lift structure to the mean chord length of the wing or lift structure. In aeronautics, a chord is the imaginary straight line joining the leading edge and trailing edge of an aerofoil, wing, or lift structure. The surface-oil flow visualization technique was used to provide insight into the aerodynamic mechanisms of the alula. A critical parameter of the alula is found to be its spanwise location on the wing. The magnitude of rolling moment generated by the alula at high angles of attack is proportional to its distance from the wing's side edge such that larger control forces occur with the alula closer to the midspan of the wing. These curious trends are attributed to the alula's ability to reattach otherwise separated flow over the outer portion of the wing with reattached flow covering an area proportional to the alula's distance from the wing's side edge. If the alula is located optimally, lift enhancement at post-stall conditions can be as high as approximately 25% and rolling moments can be greater than that of a −20° flap aileron deflection at zero angle of attack, where the wetted area of the reference flap aileron is three times that of the alula. Control forces are severely attenuated for the tested wings of sweep angle greater than 15°. A new control strategy for maneuvering wings of low sweep angle at high angles of attack is proposed which entails coordinated shifting of two alulae on the wing to control i) the percentage of reattached flow on the wing (lift control) and ii) the asymmetry of flow reattachment on the wing (roll control). Results regarding the gust mitigation ability of the sliding alula are also presented.

According to an aspect, a lift structure is provided. In an example embodiment, the lift structure comprises one or more alulas. A leading surface of each alula of the one or more alulas is (a) flush with a leading surface of the lift structure or (b) offset from the leading edge of the lift surface by up to approximately 10% of the chord length of the lift structure. A length of each alula of the one or more alulas is no more than approximately 20% of a span of the lift structure.

According to another aspect, a vehicle is provided. In an example embodiment, the vehicle comprises a vehicle body; and at least one lift structure coupled to the vehicle body. The at least one lift structure comprises one or more alulas. A leading surface of each alula of the one or more alulas is (a) flush with a leading surface of the lift structure or (b) offset from the leading edge of the lift surface by up to approximately 10% of the chord length of the lift structure. A length of each alula of the one or more alulas is no more than approximately 20% of a span of the lift structure.

According to still another aspect, a method of operating a vehicle at a high angle of attack is provide. In an example embodiment, the method comprises determining via one or more sensors and/or a computer processing element of the vehicle that the vehicle is operating at and/or is about to be operated at a high angle of attack. The vehicle comprises a vehicle body having the one or more sensors and/or the computer processing element coupled thereto, and at least one lift structure coupled to the vehicle body. The at least one lift structure comprises one or more alulas. A leading surface of each alula of the one or more alulas is (a) flush with a leading surface of the lift structure or (b) offset from the leading edge of the lift surface by up to approximately 10% of the chord length of the lift structure. A length of each alula of the one or more alulas is no more than approximately 20% of a lift structure length corresponding to the lift structure. The method further comprises causing, by the computer processing element, at least one of the one or more alulas to be actuated, such that, when actuated, the at least one alula has at least one of (a) an incidence angle of approximately 5-35° or (b) a deflection angle of approximately 5-40°.

BRIEF DESCRIPTION OF THE FIGURES

Figure 1A:
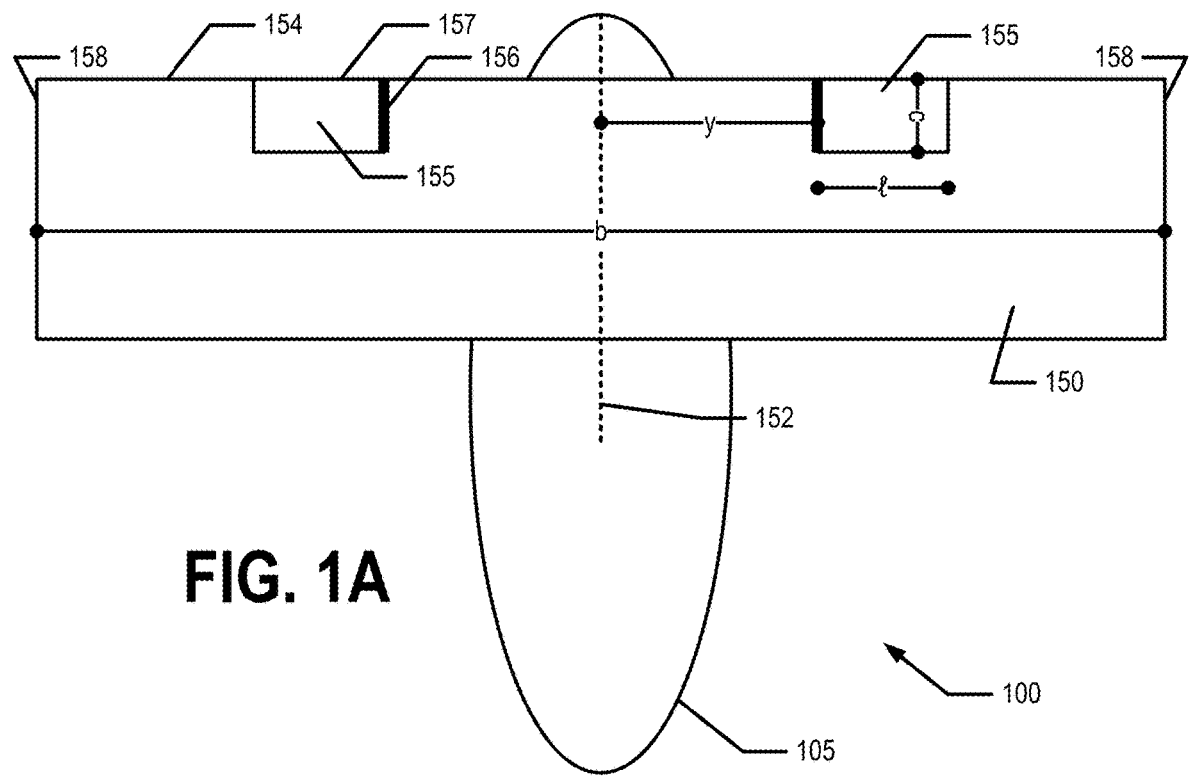

Having thus described the invention in general terms, reference will now be made to the accompanying drawings, which are not necessarily drawn to scale, and wherein:

FIG. 1A provides a schematic top view of an example vehicle and lift structure, according to an example embodiment.

Figure 1B:
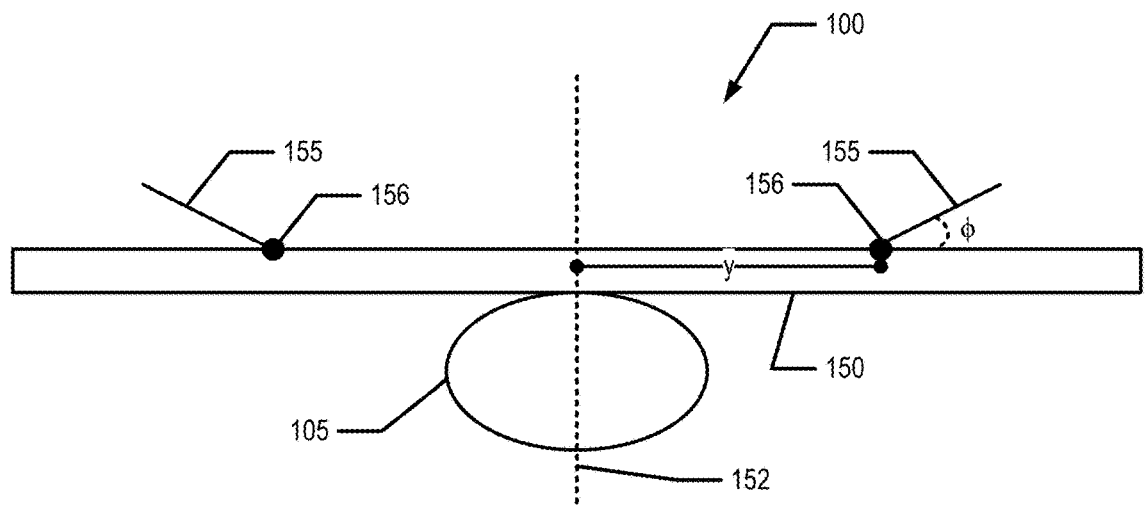

FIG. 1B provides a schematic front view of an example vehicle and lift structure, according to an example embodiment.

Figure 1E:
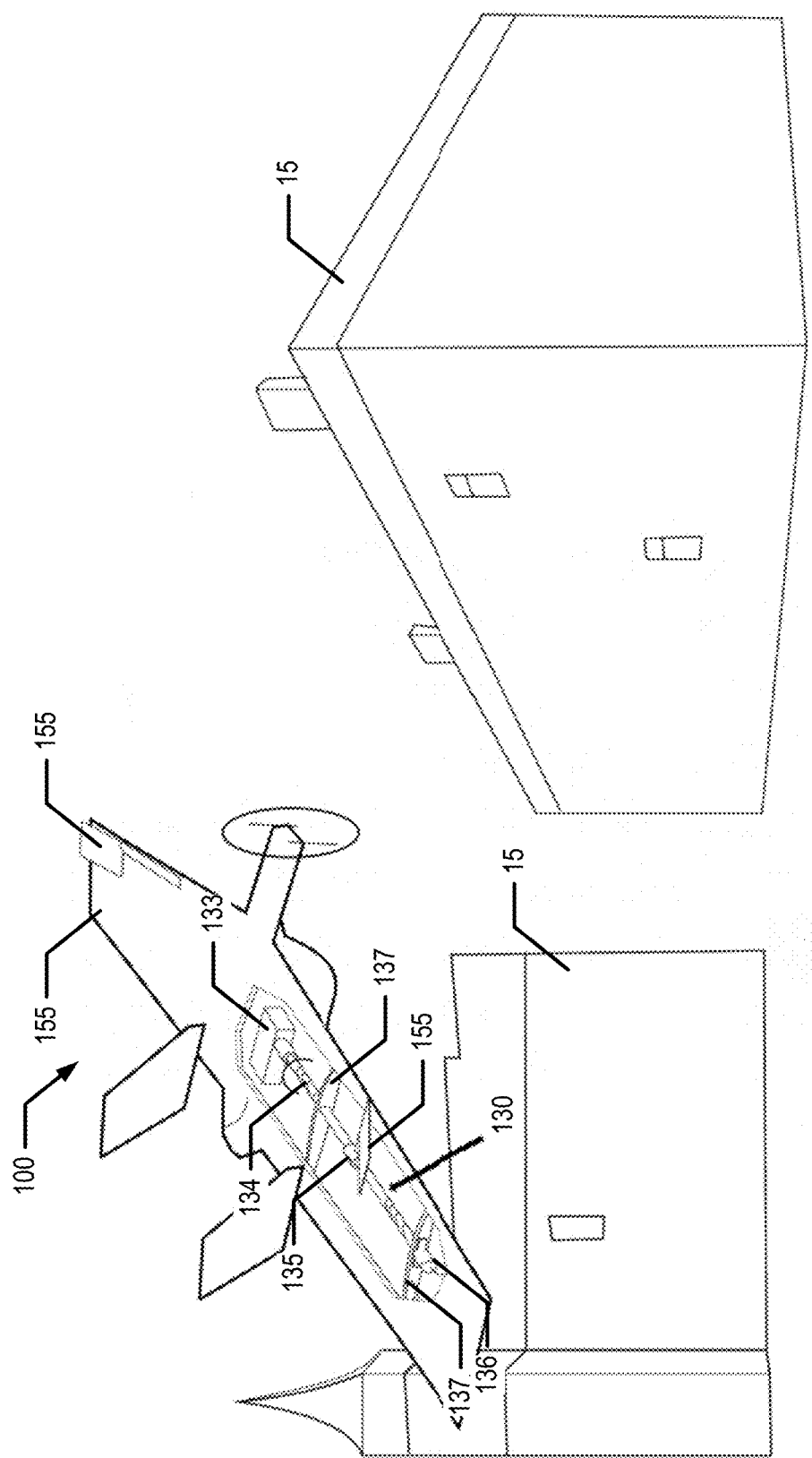

FIGS. 1C, 1D, and 1E illustrate some example scenarios of when alulas may be used to aid in the control of a vehicle, according to an example embodiment.

Figures 2, 3:
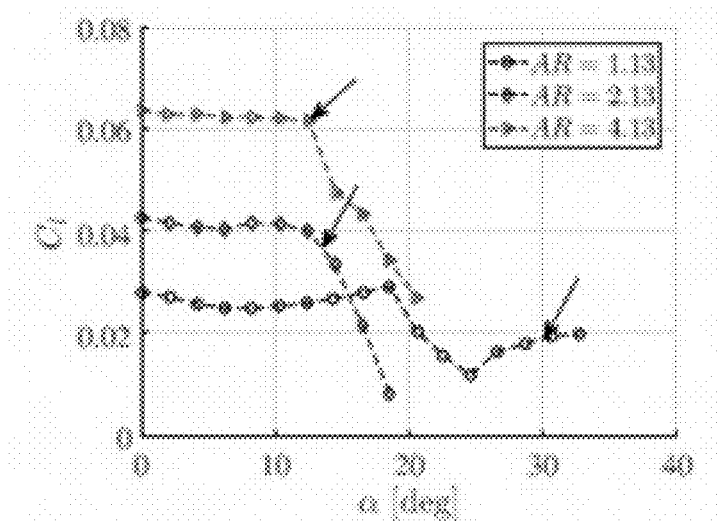

FIG. 2 provides a graph showing the reduction of roll moment at high angles of attack as produced by a −20° aileron flap deflection on rectangular wings of varying AR. Arrows mark the angle of attack of maximum lift as indicator of lift stall. Reynolds number $O(10^6)$.

FIG. 3 provides a table showing geometrical parameters for the wings tested in this investigation.

Figure 4:
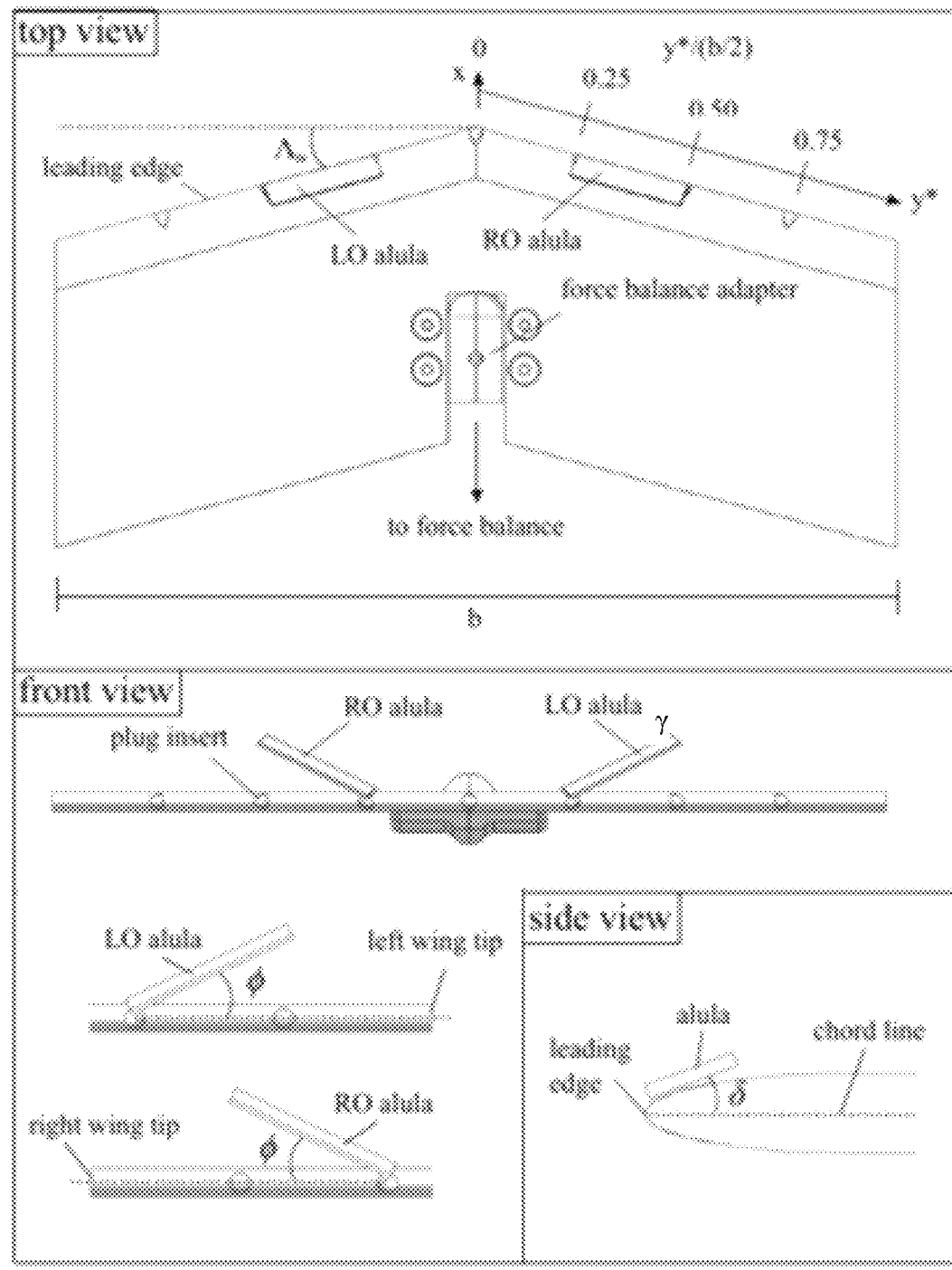

FIG. 4 illustrates a model of wing-alula assembly. A 3D alula of fixed orientation relative to the wing may be mounted at one of seven equally spaced locations along the span of the wing.

Figure 5:
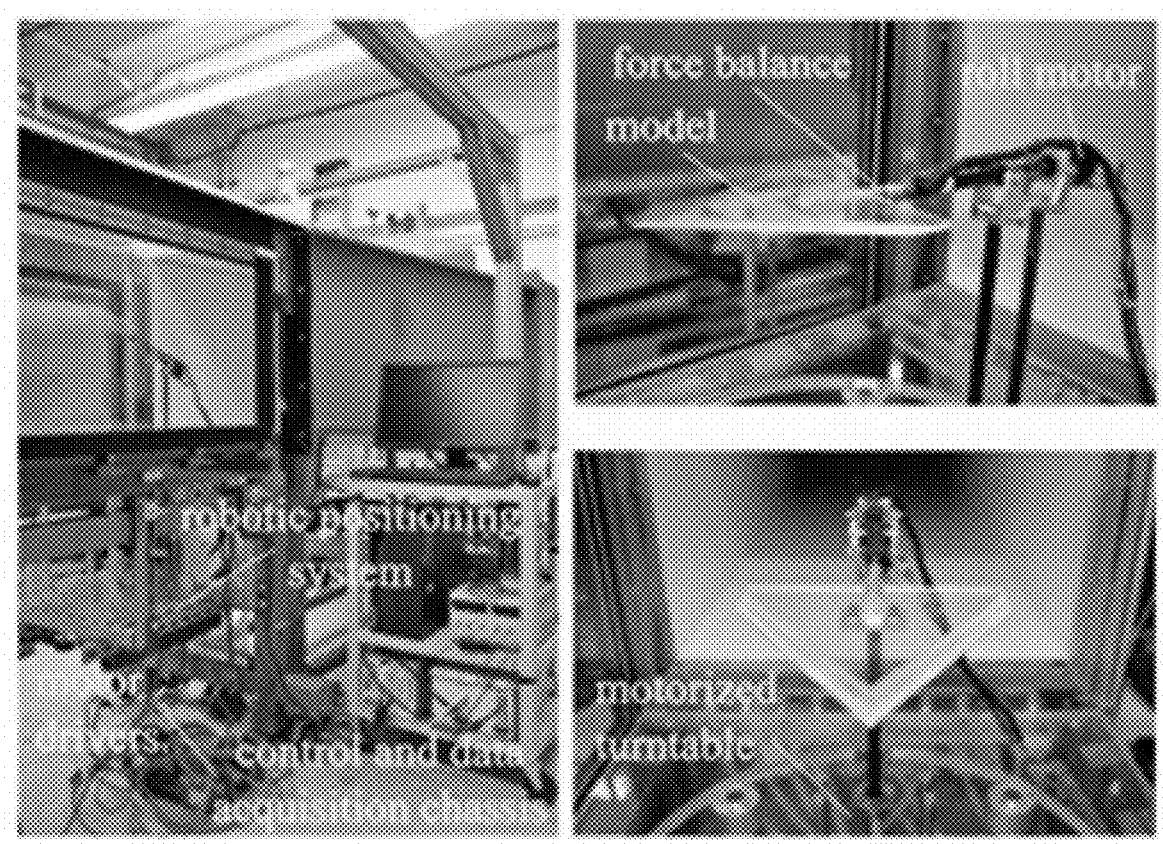

FIG. 5 shows an example experimental facility for force and moment recovery in a wind tunnel. Equipment consists of a four degree of freedom robotic positioning system and a six-component strain-gauge force balance. Angle of attack and sideslip angle are realized by pitch-plunge linearly actuated rods and a motorized turntable, respectively.

Figure 6:
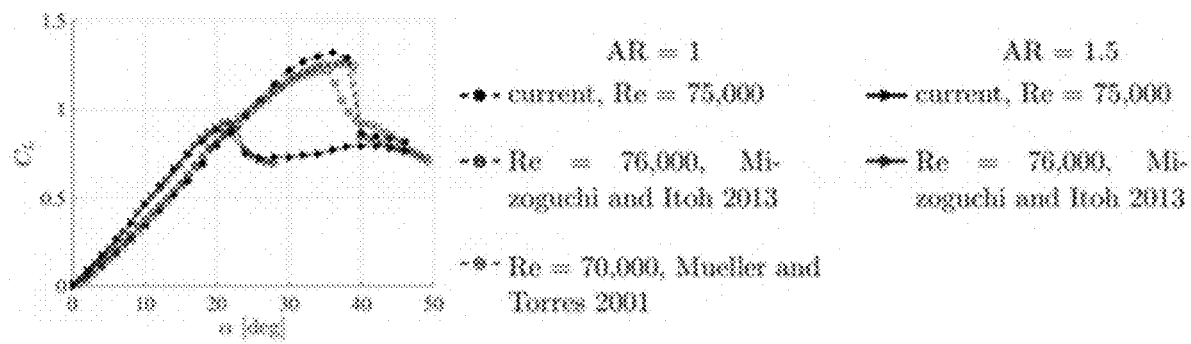

FIG. 6 provides comparisons of lift curves for AR=1 and AR=1.5 rectangular wings in various experimental facilities.

Figure 7A:
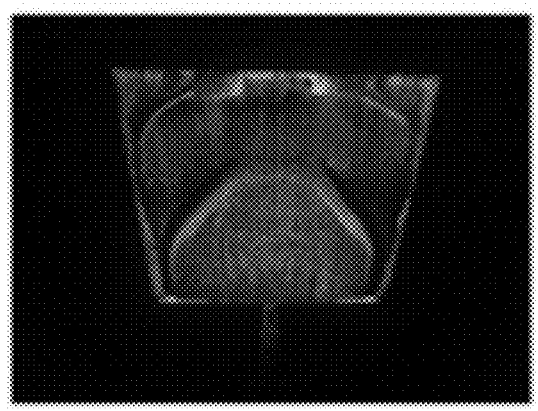
Figure 7B:
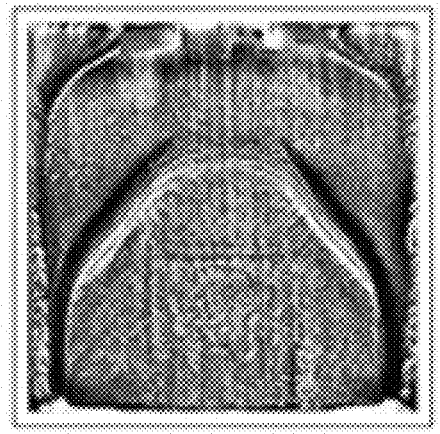

FIGS. 7A and 7B show example surface-oil flow visualizations before (A) and after (B) being dewarped and enhanced.

FIG. 8A provides a diagram of a top view of the experimental configuration, FIG. 8B illustrates lift as a function of angle of attack for alula pairs placed at various spanwise locations |y/(b/2)|, and FIG. 8C illustrates percent increase in lift due to alulae as a function of its spanwise location at select, pre-stall, stall, and post-stall angles of attack.

Figure 9:

FIG. 9 shows an AR=1.5 wing with dual opposing alula in V configuration. This is the optimum dual alula placement on this wing affording a maximum 25% increase in post-stall lift with only a 3% loss in prestall lift over the baseline alula-less wing.

Figure 10A:
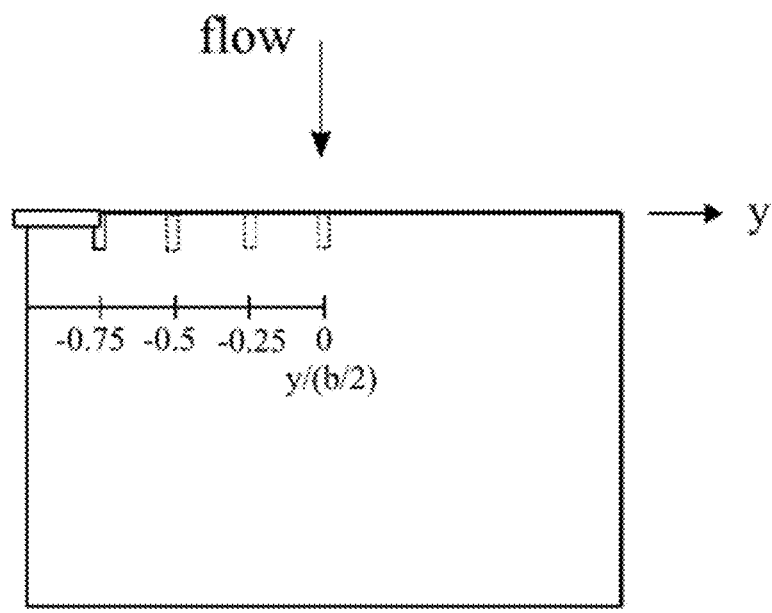

FIG. 10A provides a diagram of a top view of an experimental configuration.

Figure 10B:
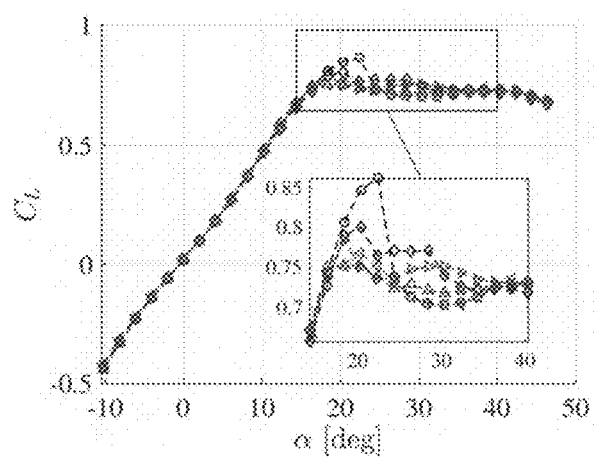
Figure 10C:
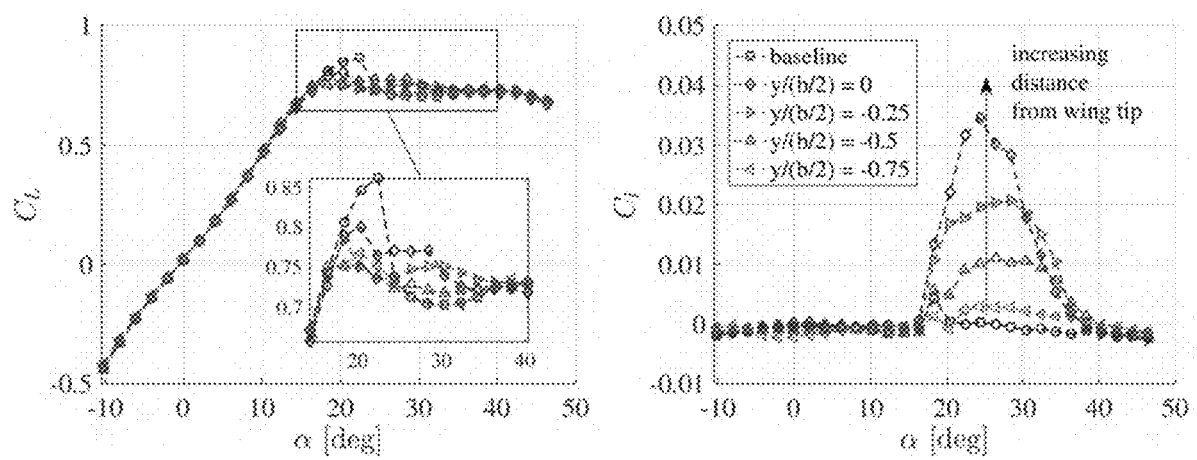

FIGS. 10B and 10C illustrate the effect of the spanwise position, y/(b/2), of a single LO alula on the (B) lift and (C) roll moment coefficient of an AR=1.5 rectangular wing for the experimental configuration shown in FIG. 10A.

Figure 11A:
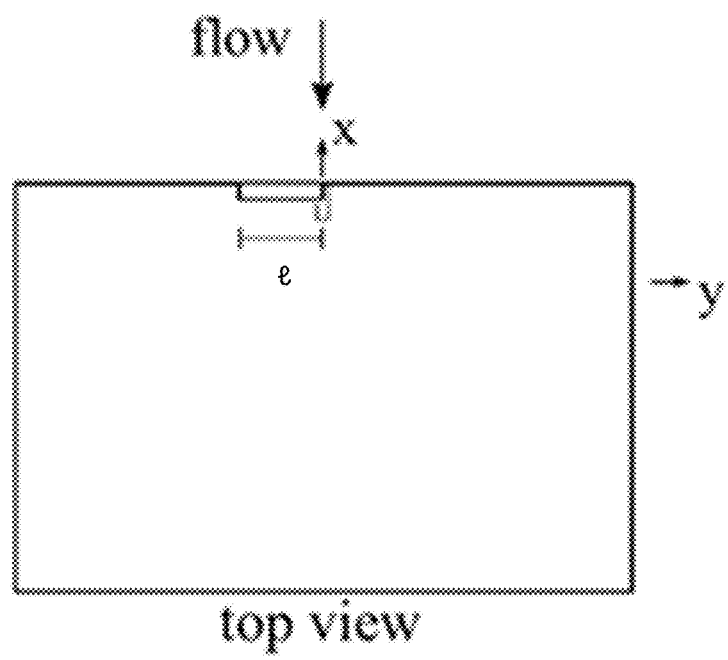

FIG. 11A provides a diagram of a top view of an experimental configuration.

Figure 11B:
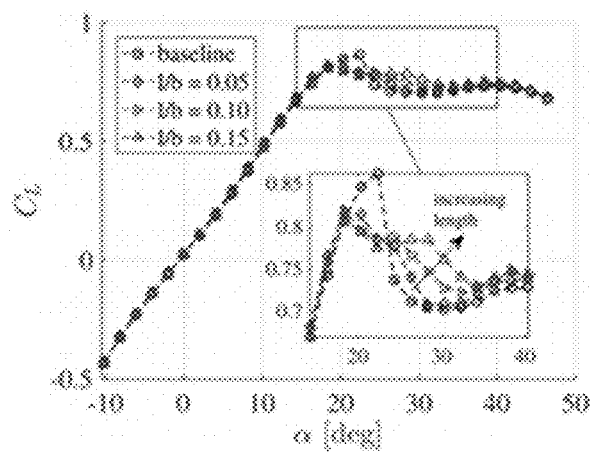
Figure 11C:
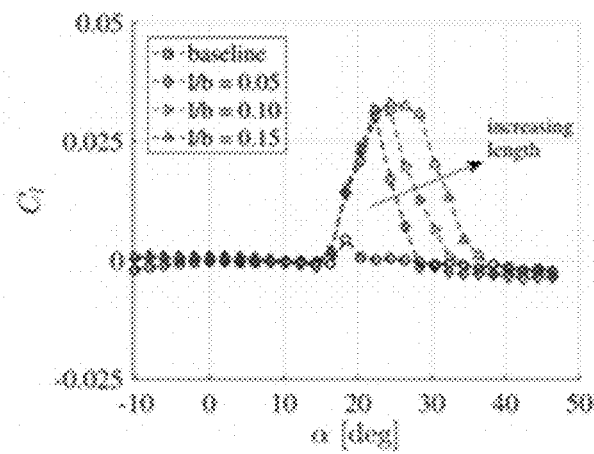

FIGS. 11B and 11C illustrate the effect of alula span length, expressed as the ratio l/b, on the (B) lift and (C) roll moment coefficient curves of an AR=1.5 rectangular wing for the experimental configuration shown in FIG. 11A.

Figure 12A:
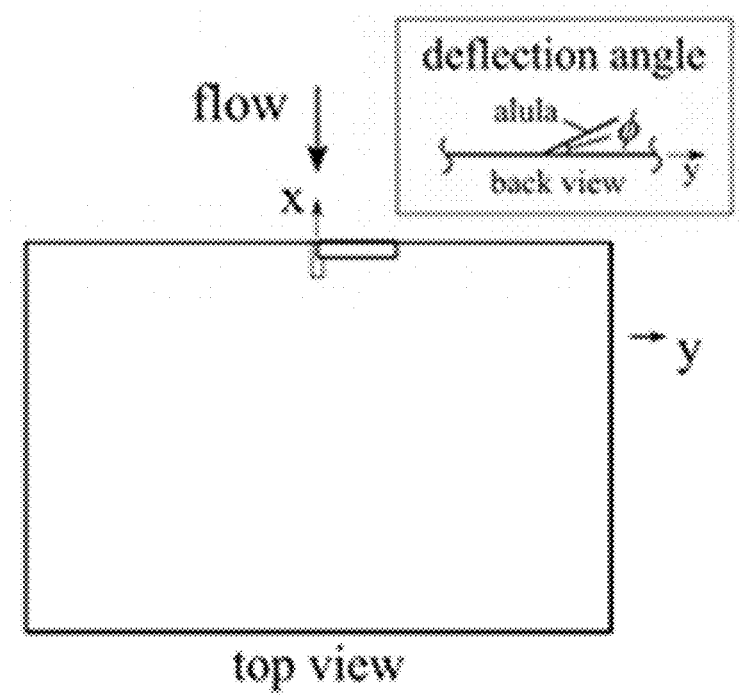

FIG. 12A provides a diagram of a top view of an experimental configuration.

Figure 12B:
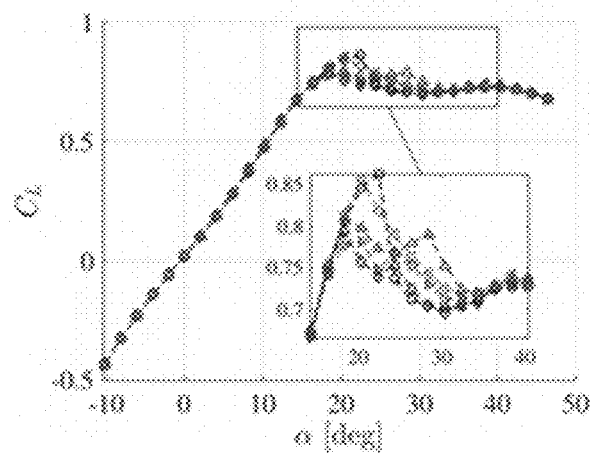
Figure 12C:
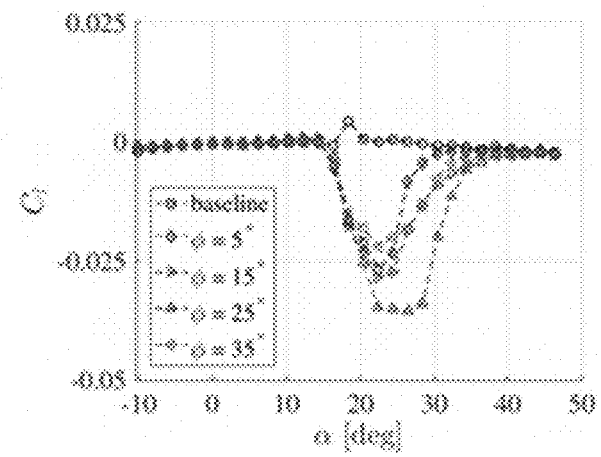

FIGS. 12B and 12C illustrate the effect of alula deflection angle on the (B) lift and (C) roll moment coefficient curves of an AR=1.5 rectangular wing for the experimental configuration shown in FIG. 12A.

Figure 13A:
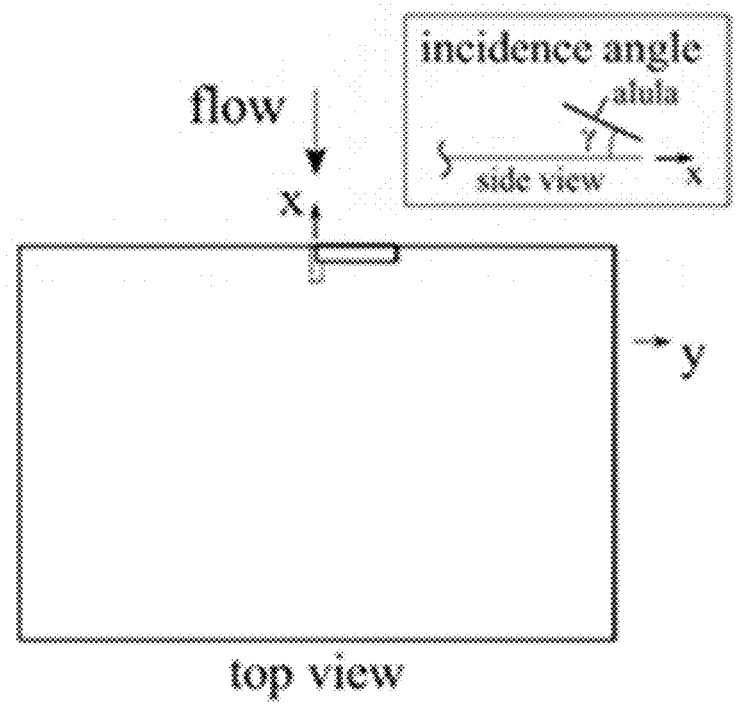

FIG. 13A provides a diagram of a top view of an experimental configuration.

Figure 13B:
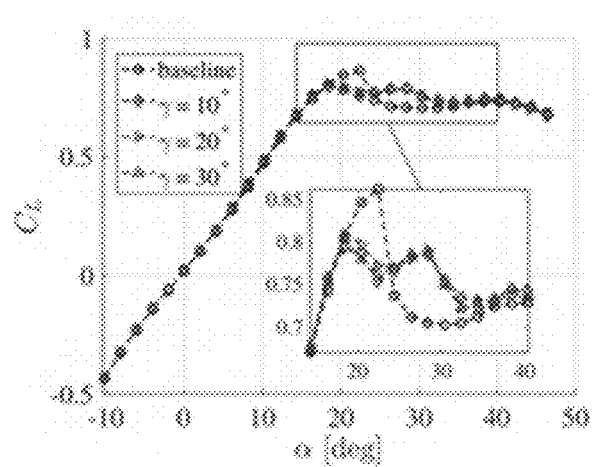
Figure 13C:
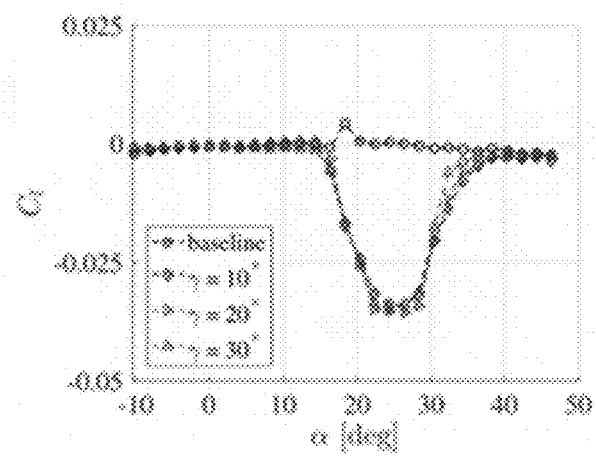

FIGS. 13B and 13C illustrate the effect of alula incidence angle on the (B) lift and (C) roll moment coefficient curves of an AR=1.5 rectangular wing for the experimental configuration shown in FIG. 13A.

Figure 14:
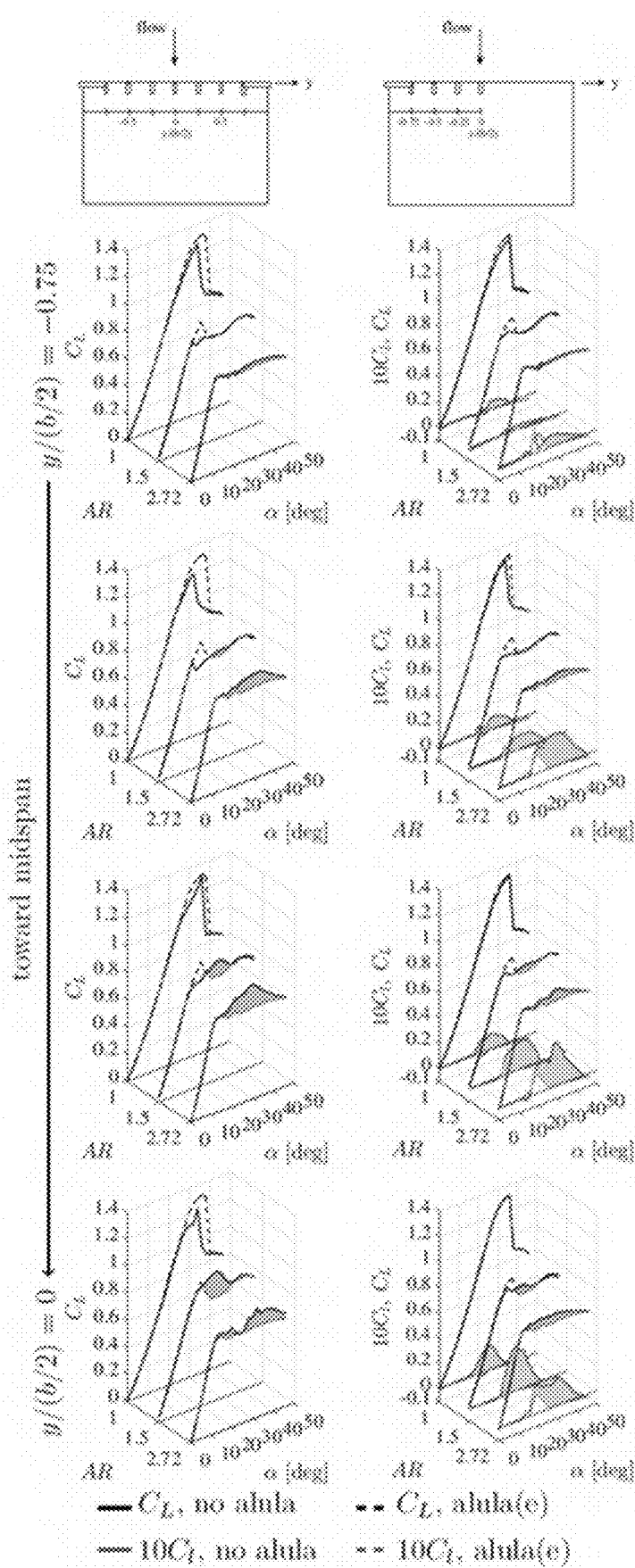

FIG. 14 provides plots showing the effect of wing aspect ratio, angle of attack, and spanwise location of alula on lift and roll moment coefficient. Left column designates dual alula cases. Right column designates single alula cases. Shaded regions highlight positive changes in lift and roll moment due to the alula over the plain wing.

FIGS. 15A and 15B provide graphs showing (A) maximum change in roll moment and (B) corresponding percent change in lift over the plain wing as a function of alula spanwise position for wings of various aspect ratios.

FIGS. 16A and 16B provide graphs showing (A) maximum change in roll moment and (B) corresponding percent change in lift over the plain wing as a function of alula spanwise position for wings of various sweep angles.

Figure 17:
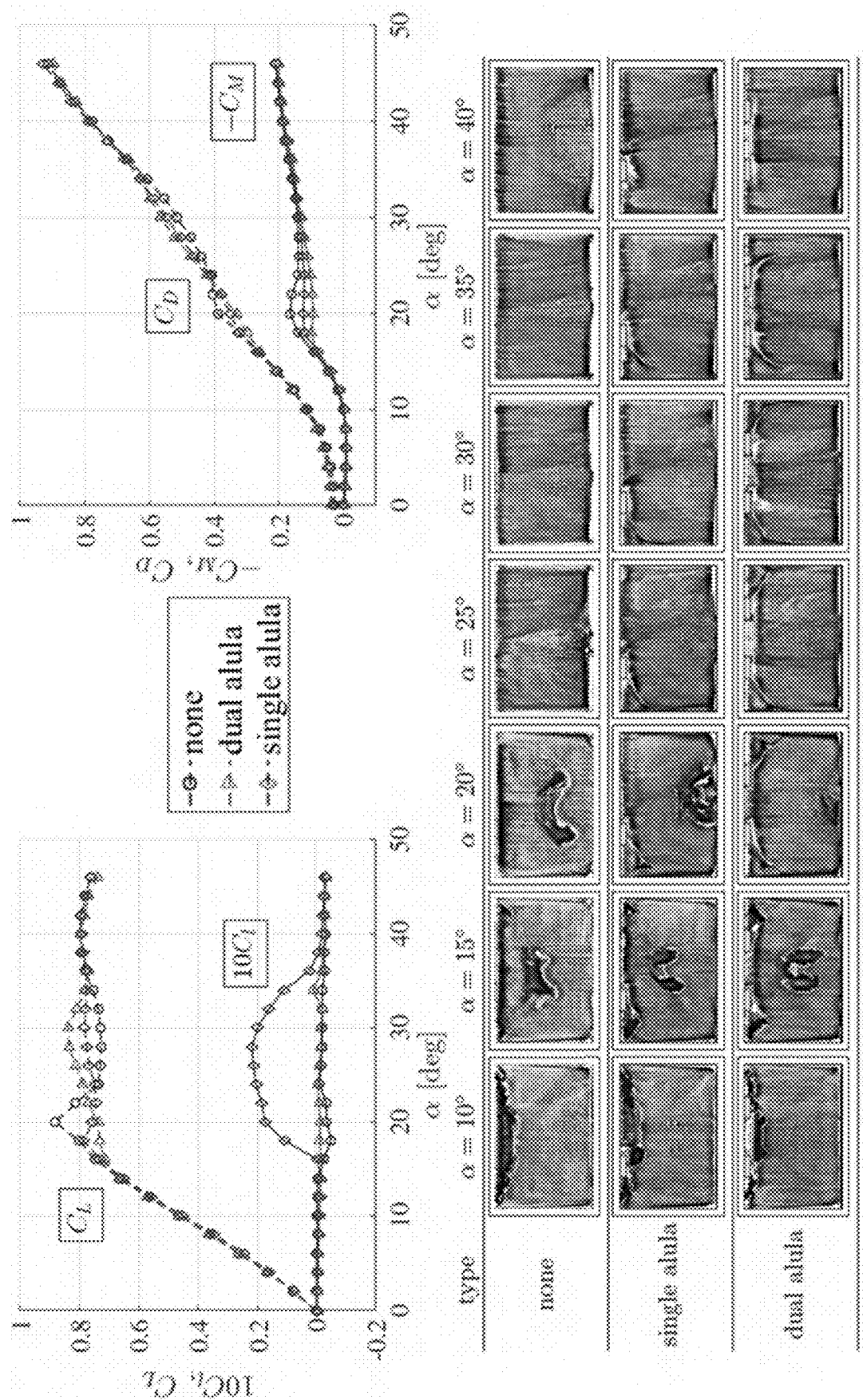

FIG. 17 provides comparisons of lift, drag, roll moment, and nose-down pitching moment coefficient curves (top) and surface-oil flow visualizations (bottom) of AR=1.5 rectangular wing with no alula, single alula, and dual alula at select angles of attack. For the single alula case the aula is positioned at y/(b/2)=−0.25 (left side of the wing) and canted toward the left wing tip. This alula configuration is mirrored on the right side of the wing for the dual alula case.

Figure 18:
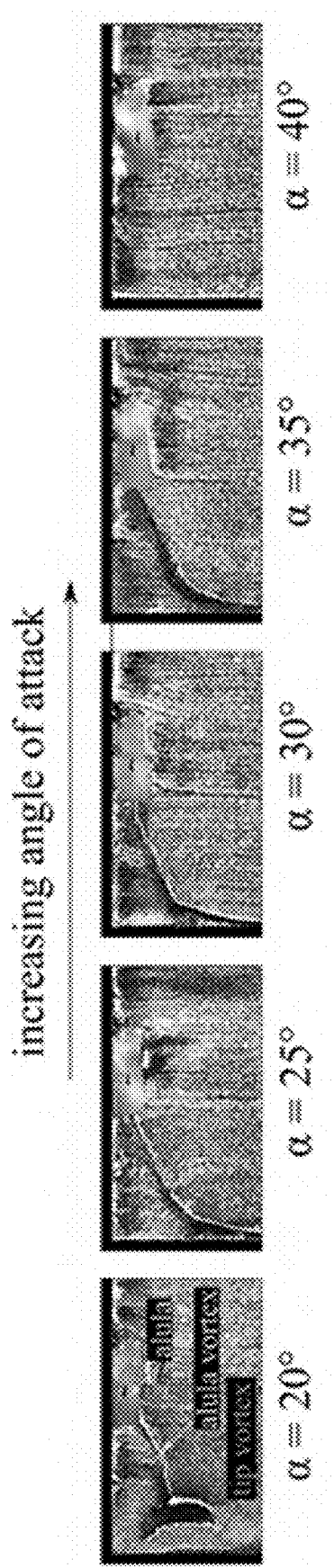

FIG. 18 illustrates the effect of angle of attack on the near surface flow structures generated by the alula on an AR=1.5 rectangular wing. Reattachment lines due to the tip vortex and alula vortex are marked. A distinct half-moon shape is seen at the lowest angle of attack which is attributed to the alula vortex having insufficient strength and/or axial velocity to penetrate the wing tip flow. At higher angles of attack this is no longer the case as the alula vortex reattachment line extends all the way toward the wing tip.

Figure 19:
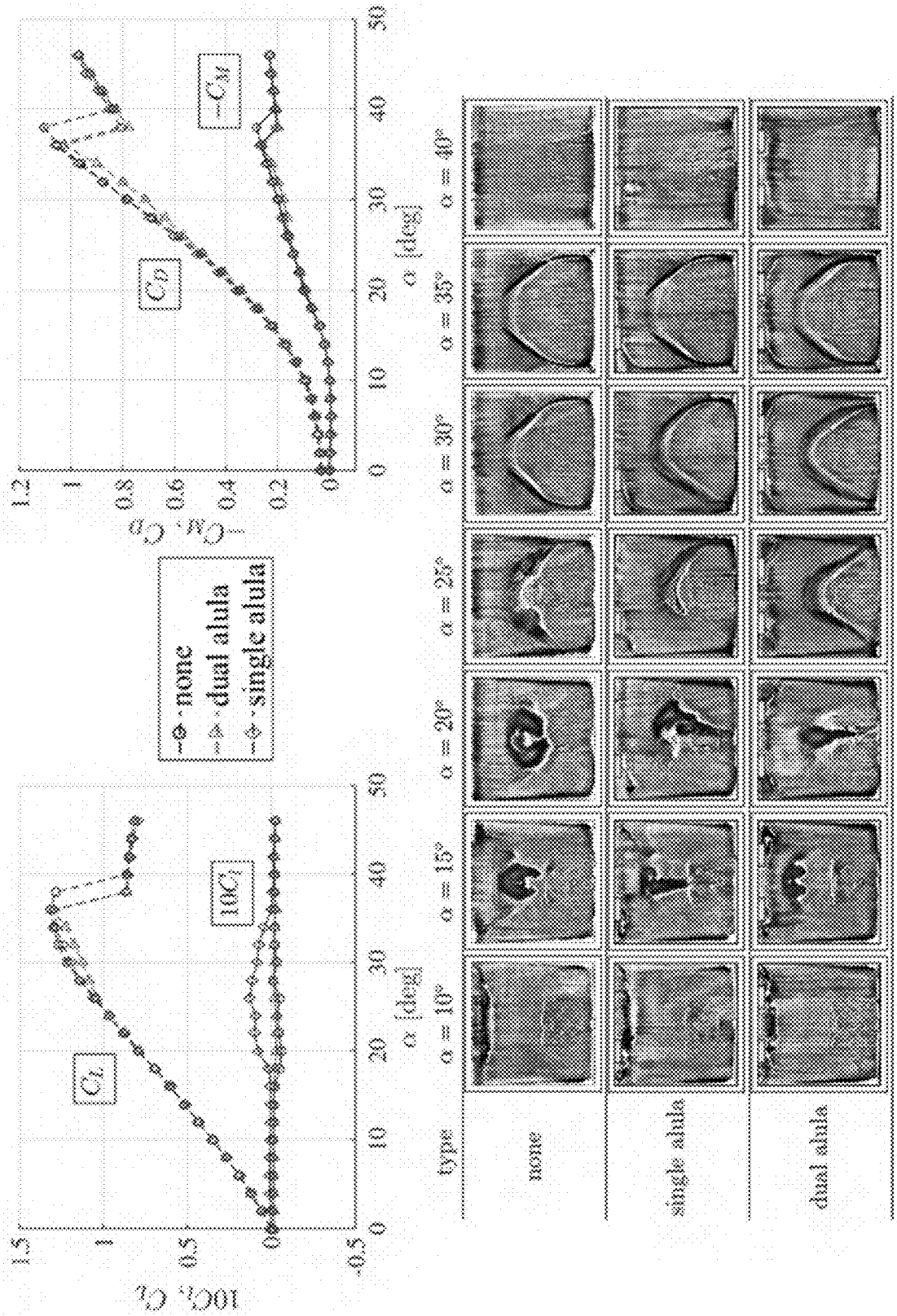

FIG. 19 provides comparisons of lift, drag, roll moment, and nose-down pitching moment coefficient curves (top) and surface-oil flow visualizations (bottom) of AR=1 rectangular wing with no alula, single alula, and dual alula at select angles of attack. For the single alula case the aula is positioned at y/(b/2)=−0.25 (left side of the wing) and canted toward the left wing tip. This alula configuration is mirrored on the right side of the wing for the dual alula case.

Figure 20:
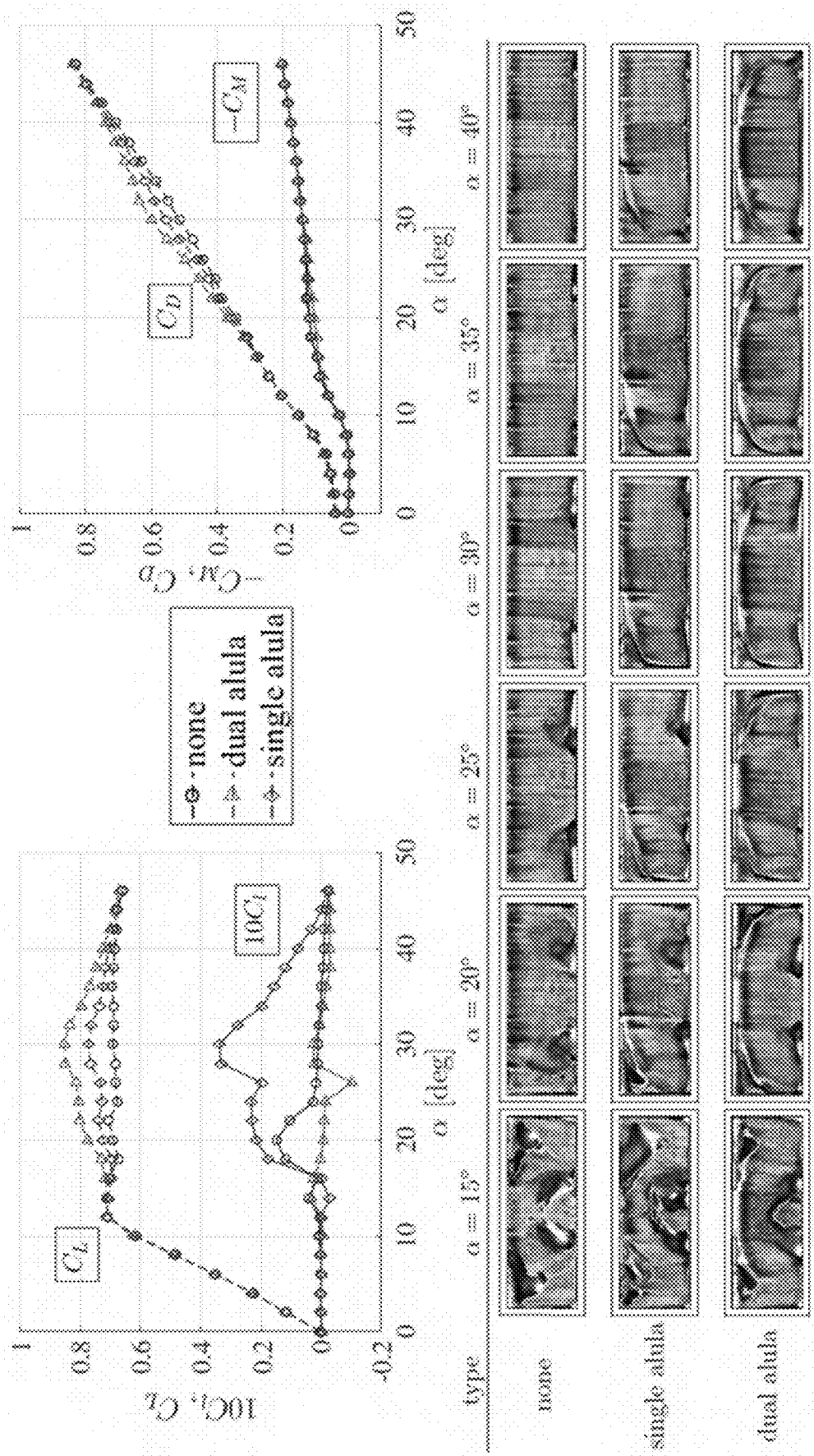

FIG. 20 provides comparisons of lift, drag, roll moment, and nose-down pitching moment coefficient curves (top) and surface-oil flow visualizations (bottom) of AR=2.73 rectangular wing with no alula, single alula, and dual alula at select angles of attack. For the single alula case the aula is positioned at y/(b/2)=−0.25 (left side of the wing) and canted toward the left wing tip. This alula configuration is mirrored on the right side of the wing for the dual alula case.

FIGS. 21A, 21B, and 21C provide surface-oil flow visualizations of an AR=1.5 wing at $\alpha$=25° with (A) no alula, (B) dual opposing alula whose roots are located at |y/(b/2)|=0, and (C) dual opposing alula whose roots are located at |y/(b/2)|=0.25. The alulae are indicated by yellow boxes and flow reattachment lines are marked by arrows. Flow is from top to bottom. Surface patterns suggest that the alula influences wing aerodynamics by reattaching otherwise separated flow at spanwise stations outboard of the alula.

FIG. 22 illustrates the change in lift and roll moment as a function of alula spanwise location for AR=1.5 rectangular wing at $\alpha$=25°, $C_L$≈0.734. Pictures depict corresponding surface-oil visualizations of the wing with no alula (top) and the wing with a single leftward oriented alula placed at various spanwise locations on the wing designated by y(b/2), where y(b/2)=0 is the midspan of the wing (bottom).

Figures 23A, 23B, 23C:
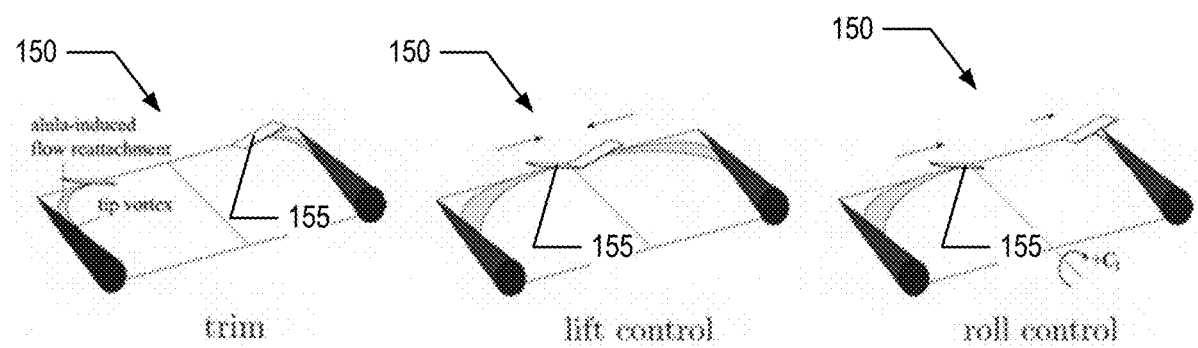

FIGS. 23A, 23B, and 23C provide schematic diagrams of sliding alula control of lift and roll moment at high angles of attack, according to an example embodiment. Symmetric inboard/outboard movement of alula controls lift at the cost of drag. Shifting of alula to left or right controls roll moment without substantial changes in lift or drag.

FIG. 24 illustrate roll moment as a function of angle of attack for the AR=1.5 wing at $\beta$=0°, $\beta$=−5°, and $\beta$=−10° equipped with either a leeward oriented (LO) alula placed on the leeward wing semispan or a windward oriented (WO) alula placed on the windward wing semispan. Equation. 1 predicts roll moment due to sideslip for the plain wing without an alula up until the angle of attack of roll stall, $\alpha$≈18°. At $\alpha$>16° the LO alula reduces the roll moment generated in sideslip by a magnitude proportional to its distance from the leeward wing tip whereas the WO alula increases the roll moment generated in sideslip by a magnitude proportional to its distance from the windward wing tip.

DETAILED DESCRIPTION OF VARIOUS EMBODIMENTS

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout. The term approximately is used herein to refer to within appropriate manufacturing and/or engineering tolerances.

FIGS. 1A and 1B illustrate an example embodiment of the present invention. FIG. 1A shows a top view of a vehicle 100 and FIG. 1B shows a front view of the vehicle 100 with two alulas 155 that are in an actuated state (e.g. in an in use position). Various embodiments provide a lift structure 150 having an alula 155. Various embodiments provide a vehicle 100 having one or more lift structures 150 that have an alula 155. For example, the lift structure 150 may have one alula 155 or two alula 155 (e.g., one on each side of the lift structure). An alula 155 is a flap or structure that has its leading edge 157 approximately flush with the leading edge 154 of the corresponding lift structure 150. In an example embodiment, the alula 155 is a flap or structure that has its leading edge 157 offset from the leading edge 154 of the lift structure 150 by no more than 10% of the chord length of the lift structure 150. For example, an alula 155 is a miniature (compared to the wing or lift structure 150 to which the alula 155 is secured), canted, control surface located on the leading edge of the wing or lift structure 150.

The alula 155 has a root 156 at which the alula 155 is secured to the lift structure 150. In various embodiment, the alula 155 may be able to be rotated and/or moved about the root 156 such that the alula 155 may be actuated. For example the alula 155 may be rotated and/or moved about the root 156 from a storage position having a deflection angle $\phi$ of approximately zero to an in use position having a deflection angle $\phi$ in the range of approximately 5-40°. For example, the root 156 may be a hinged and/or rotatable attachment mechanism. For example, in various embodiments, the lift structure 150 defines a plane. When the alula 155 is in the storage position, the alula 155 is generally parallel and/or flush to the plane defined by the lift structure 150. When the alula 155 is in the in use position, the alula 155 is canted and/or deflected out of and/or with respect to the plane defined by the lift structure 150 such that a non-zero deflection angle $\phi$ exists between the leading edge 157 of the alula 155 and the leading edge 154 of the lift structure 150.

In an example embodiment, the root 156 may be translated along at least a portion of the leading edge 154 of the lift structure 150 such that the distance y between the root 156 and a central axis 152 of the lift structure may be changed. For example, translating the root 156 along at least a portion of the leading edge 154 of the lift structure 150 may cause the distance between the root 156 and the tip 158 of the corresponding wing to change. In an example embodiment, the root 156 may be continuously translated and/or moved between discrete positions along at least a portion of the leading edge 154 of the lift structure 150 by a motor or other automated mechanism when the vehicle 100 is in use or not in use. In an example embodiment, the root 156 may be manually translated between discrete positions along at least a portion of the leading edge 154 of the lift structure 150 when the vehicle 100 is not in use (e.g., is parked).

In various embodiments, the vehicle 100 comprises a vehicle body 105 to which the one or more lift structures 150 are coupled. In various embodiments, the vehicle body 105 may house and/or have coupled thereto one or more engines and/or motors, communications equipment, sensors, one or more computer processing elements and/or the like.

In an example embodiment, the lift structure 150 is a wing and the lift structure 150 is also referred to as a wing herein. In an example embodiment, the lift structure 150 is an LAR wing. In an example embodiment, the vehicle 100 is a MAV. For example, the inclusion of an alula 155 on on or more wings of the MAV provides as a lightweight, minimally intrusive, high-angle-of-attack roll control solution for Micro-Aerial Vehicles. For example, one or more alulas 155 onboard one or more wings of an MAV may be used to aid in control of the MAV during a runway landing, carrier landing (e.g., landing on an aircraft carrier), during net recovery of the MAV, and/or the like. For example, FIG. 1C illustrates an example of a vehicle 100 comprising a lift structure 150 including alulas 155 that are being used to aid in control of the vehicle 100 during a net recovery of the vehicle 100 using net 5. In another example, FIG. 1D illustrates an example of a vehicle 100 comprising a lift structure 150 including alulas 155 that are being used to aid in control of the vehicle 100 during a carrier landing of the vehicle 100 onboard an aircraft carrier 10. As shown in FIG. 1D, the lift structure 150 may further include one or more deflection mechanisms, such as a linear actuator 145, each configured to actuate an alula 155.

In another example, one or more alulas 155 that may be translated along at least a portion of one or more wings of an MAV may be used to aid in control of the MAV as part of a gust rejection system or during a rolling maneuver. For example, FIG. 1E illustrates an example of a vehicle 100 comprising a lift structure 150 including alulas 155 that are being used to aid in control of the vehicle 100 as part of a gust rejection system in an area where the vehicle 100 is in proximity to one or more obstacles, such as buildings 15. The lift structure 150 shown in FIG. 1E illustrates an example sliding mechanism 130 configured for sliding or translating an alula 155 along at least a portion of the span of the lift structure 150. For example, the sliding mechanism 130 includes a motor 133, such as a servo motor and/or the like, configured to rotate an elongated member 134. In various embodiments, the motor 133 may be controlled by a computing entity onboard and/or controlling the vehicle 100 to cause translation of the corresponding alula 155 along the elongated member 134. In an example embodiment, the elongated member 134 may comprise threadings. In an example embodiment, the elongated member 134 extends transverse to ribs 137 of the lift structure 150. For example, the elongated member 134 may extend between two or more ribs 137 of the lift structure 150. The sliding mechanism 130 may further comprise a sleeve 135. For example, the sleeve 135 may be a nut configured to couple to the threadings of the elongated member 134. The sliding mechanism 130 may further comprise flange bearing 136. For example, the elongated member 134 may comprise a first end secured to the motor 133 and a second end, opposite the first end, that is secured to the lift structure 150 via the flange bearing 136. For example, the flange bearing 136 may be configured to secure the second end of the elongated member 134 to a rib 137, for example, of the lift structure 150 while allowing the elongated member 134 to rotate (e.g., around the axis of the elongated member 134) with respect to the rib 137.

As shown in FIG. 1A, a lift structure 150 may have a width b. An alula is located at a distance y from a central axis 152 of the lift structure 150. The alula has a length l. The lift structure length or span b (e.g., the distance between one lift structure tip 158 and the opposite lift structure tip 158, where the lift structure tips 158 are sides of the lift structure 150 that are transverse to the leading edge 154 of the lift structure 150) of the lift structure 150 is larger than the alula length l. In an example embodiment wherein the lift structure 150 is a wing, the lift structure length or span b is the wingspan of the wing. For example, the alula length l is no greater than approximately 0.2b. In various embodiments, the alula length l≈0.05b–0.15b. In an example embodiment, the chord length c of the alula is no more than 20% of the chord length of the lift structure 150. In various embodiments, the leading surface 157 of the alula 155 is flush, aligned with, and/or plumb to the leading surface 154 of the lift structure 150. In various embodiments, the leading surface 157 of the alula 155 is offset from the leading edge 154 of the lift structure 150 by no more than 10% of the chord length of the lift structure 150.

In an example embodiment, the alula 155 are secured to the lift structure 150 in a fixed orientation. For example, the alula 155 may be secured to the lift structure 150 such that the incidence angle $\gamma$ and/or deflection angle $\phi$ is fixed. In another example embodiment, the alula 155 are secured to the lift structure 150 such that the incidence angle $\gamma$ and/or the deflection angle $\phi$ may be changed (e.g., by rotating the alula 155 about the root 156, and/or the like). For example, the alula 155 may be secured to the lift structure 150 at the root 156 such that the alula 155 may be held in a storage position with the alula 150 approximately flat to the lift structure 150 (e.g., deflection angle $\phi$ of approximately zero) when the alula 155 is not in use and may be moved out to a deflection angle $\phi \approx 5\text{-}40°$ and/or incidence angle $\gamma \approx 5\text{-}35°$ when the vehicle 100 is traveling at a high angle of attack. For example, the lift structure 150 may have one or more actuatable alulas 155 affixed thereto. For example, the one or more alulas 155 may be actuatable such that an alula 155 may be rotated from a storage position to an in use position with a deflection angle $\phi \approx 5\text{-}40°$ and/or incidence angle $\gamma \approx 5\text{-}35°$. For example, one or more sensors and/or a computer processing element coupled to and/or housed by the vehicle body 105 may determine that the vehicle is being operated at and/or is about to be operated at a high angle of attack and then cause one or more actuatable alulas 155 of the lift structure(s) 150 coupled to the vehicle body 105 to be actuated (e.g., moved and/or rotated from the storage position to the in use position). For example, in an example embodiment, an actuatable alula 155 may be coupled to a linear actuator 145 for actuating (e.g., moving, rotating, and/or the like) the alula 155 between the storage position to the in use position and vice versa. The alula(s) 155 may be deactuated (e.g., returned to the storage position from the in use position) when the one or more sensors and/or computer processing elements determine that the vehicle 100 is no longer being operated at a high angle of attack.

In an example embodiment, the alulas 155 are secured to the lift structure 150 at a fixed position (e.g., a fixed value of y). In an example embodiment, one or more of the alula 155 secured to the lift structure 150 to a slidable manner. In various embodiments, an alula 155 is secured to the lift structure 150 such that the alula 155 may be shifted along the semispan and/or the span of the lift structure 150. For example, the alula 155 may be secured to a sleeve that may be slid along a rod, screw, or other elongated element that extends at least part of the way along the length of the lift structure 150 in a controlled manner (e.g., by a motor or other mechanism) to move the alula 155 to a desired position (e.g., desired value of y). For example, the root 156 of the alula 155 may be secured to the lift structure 150 such that the root 156 may be translated at least part way along the span or semispan of the lift structure 150. For example, the root 156 may be a fixed and/or hinged attachment mechanism that secures the alula 155 to a sleeve and/or a rod, screw, or other elongated element that extends at least part of the way along the length of the lift structure 150, such that the root 156 may be translated along at least a portion of the span or semispan of the lift structure 150. The changes in the spanwise location of the alula 155 on a lift structure 150 produce corresponding changes force and moment production for the lift structure 150 providing a new strategy for lift and roll control at high angles of attack.

Thus, in various embodiments, an alula 155 may be secured to a lift structure in a fixed manner. An alula 155 that is secured to the lift structure 150 in an a fixed manner is secured to the lift structure at a fixed position y, a fixed deflection angle $\phi$, and a fixed incidence angle $\gamma$. In various embodiments, an alula 155 may be secured to a lift structure 150 in a translatable manner. An alula 155 that is secured to the lift structure 150 in a translatable manner is secured to the lift structure such that the position y of the alula 155 along the leading edge 154 of the lift structure 150 may be changed or modified. In various embodiments, an alula 155 may be secured to a lift structure 150 in an actuatable manner. An alula 155 that is secured to the lift structure 150 in an actuatable manner is secured to the lift structure such that the deflection angle $\phi$ and/or incidence angle $\gamma$ may be changed modified. In an example embodiment, an alula 155 may secured to a lift structure 150 in both a translatable and actuatable manner.

Various aspects of the vehicle 100, lift structure 150, and alulas 155 are described in more detail below. The below description primarily refers to lift structures 150 that are wings and vehicles 100 that are micro-aerial vehicles (MAV). However, it should be understood that various embodiments of the present invention relate to vehicles 100 that are underwater vehicles and lift structures 150 that are fins.

Experimental Models

Various experiments are presented herein that illustrate various features of lift surfaces 150 comprising one or more alulas 155. The inventors conducted experiments in the Engineering Laboratory Design (ELD) recirculating wind tunnel located at the University of Florida. The test section has a 61×61 cm² cross-section and is 2.44 m in length. The wind tunnel can achieve freestream velocities ranging from 3-91.4 m/s and has a freestream turbulence intensity of 0.12% at the tested speeds. Direct six-component force and moment measurements and surface-oil flow visualizations were conducted in the ELD tunnel. For each measurement the Reynolds number was fixed at Re=75,000. The experiments used wing lift structures 150.

Geometrical parameters of the model wings are tabulated in Table 1, shown in FIG. 3, where the dotted line depicts the quarter-chord line. Key parameters of the wing geometry varied was the aspect ratio and the quarter-chord sweep angle of the wing. Additional experiments were conducted on several heavily tapered wings with with and without sweep with geometries as shown. All wings in Table 1 had a 5:1 leading-edge profile and square side and trailing edges. The thickness-to-chord ratio of these wings, expressed as a percentage, was 3.5% and 6.4% for the AR=1/1.5 and AR=2.73 wings, respectively.

Each wing was 3D printed using a 3D Systems Projet 2500 multijet printer. The printer has a net build volume (XYZ) of 294×211×144 mm with a 800×900×790 DPI resolution with 32 μm layers. Resolution before post processing is +/−0.025-0.05 mm per 25.4 mm of part dimension. The material was VisiJet M2 RWT.

Each wing had a total of seven equally spaced cylindrical housings spread across the leading-edge of the wing (see FIG. 4). The housings were designed to accept and secure specially designed alula attachments and/or plug inserts. The plug inserts were fabricated to ensure, to machine tolerance, a smooth leading-edge profile. The alula attachments consisted of a plug insert with a fused lifting surface. This lifting surface modeled a rigid, rectangular, flat plate with a specific orientation with respect to the wing. Details of the alula parameters are described next.

Parameters of the Model Alula

The alula is modeled as a rigid flat plate with a fixed geometry, orientation and spanwise position on the wing. The geometry of the alula is described by the span ratio, l/b, or the ratio of the length of the alula to the span of the wing, and its chord ratio, or the ratio of the alula chord to the chord of the wing. In the investigated models, the chord ratio for alula on the wing was fixed at 0.0750 while the span ratio was varied from l/b=0.05 to 0.15.

The geometry and spanwise positioning of the alula is motivated by biological measurements. Measurements of over 40 species of bird wings show the span ratio of the alula ranges from l/b=0.5 (for high speed soaring type birds) to 0.1 (for birds with an elliptical wing with active flapping flight in cluttered environments).

The orientation of the deployed alula is defined by three angles: i) Incidence angle, $\gamma$, the inclination angle of the alula chord relative to the wing chord. ii) Deflection angle or cant angle, $\varphi$, defined by the rotation of the alula from the plane of the wing. iii) Pronation angle, or the sweep angle of the alula relative to the wing's leading edge. Only the incidence angle and deglection angle are varied in this study. The pronation angle was fixed at 0° such that the leading-edge of the alula is aligned with the leading-edge of the wing.

The terminology LO and RO is used to designate whether the alula is leftward or rightward oriented, respectively, as seen by an observer at the trailing-edge of the wing facing the leading edge of the wing (see FIG. 4). Unless otherwise noted, the LO alulae are placed on the left semispan of the wing where RO alulae are placed on the right semispan of the wing. Experiments were conducted with the wing affixed with both a single alula and dual alulae. For dual alulae experiments the alula are placed symmetrically about the midspan such that the left and right semispan of the wing are mirror images of each other.

Force Measurements

Aerodynamic forces and moments were measured using the Micro-Loading Technologies (MLT) six-component internal force balance which has been used extensively by our research group. FIG. 5 shows the experimental facility for force and moment recovery in a wind tunnel used. Each model was swept through angles of attack α=−10-46°, in 2° increments using a custom robotic positioning system with a positioning error of +/−0.2°. Upon movement to the next angle of attack location, data acquisition was halted for 4 seconds to allow for initial flow transients to subside. Data was then sampled for 5 seconds at 4096 Hz. An identical sweep was made before hand with the wind off which acted as an inertial "tare" set. Strain-gage wind-on data was first subtracted from tare data to isolate the aerodynamic loads from the average inertial loads. Tared strain-gage data was then converted to aerodynamic loads using techniques outlined by the AIAA strain-gauge standard. Blockage effects from streamline curvature, wake, and solid bodies were corrected for based on methods presented in Rae, W. H. and Pope, A., Low-Speed Wind Tunnel Testing, John Wiley and Sons, New York City, N.Y., USA, 3rd ed., 1999.

In various embodiments, the one or more alulas 155 secured to the lift structure 150 may be used to modify and/or adjust various aerodynamic quantities of the lift structure 150. For example, some aerodynamic quantities of the lift structure 150 that may be modified and/or adjusted via the one or more alulas 155 are the lift coefficient, $$C_L = \frac{2L}{\rho U_\infty^2 S}$$

and roll moment coefficient, $$C_l = \frac{2l}{\rho U_\infty^2 Sb}$$

where $U_\infty$ is the freestream velocity, $\rho$ is the fluid density, S is the wing area, b is the wingspan, L is the measured lift force, and l is the roll moment. Estimates of uncertainty for coefficient quantities were obtained by applying the Taylor series method for uncertainty propagation as described in Coleman, H. W. and Steele, W. G., Experimentation, Validation, and Uncertainty Analysis for Engineers, John Wiley and Sons, Hoboken, N.J., USA, 3rd ed., 2009 to an example test case.

The test case was the AR=1.5 wing at $\alpha=28°$ with a LO alula of spanlength l/b=0.15 located at y/(b/2)=0 with $\varphi=25°$ and $\gamma=20°$ subject to uniform fluid with velocity $U_\infty=9.09$ m/s and fluid density, $\rho=1.194$ kg/m$^3$. The measured lift force, L, and roll moment, l, at this condition was 0.2179 lbs and 0.06 lbs-in, respectively. Due to the large number of samples, only uncertainties associated with bias errors are considered in this analysis. The absolute bias errors of measured variables $U_\infty$, b, and c are 0.1 m/s, 0.79 mm, and 0.79 mm, respectively. Relative bias errors of l and L are 4.2% and 2.3%, respectively. Bias errors of lift and roll moment were obtained by loading the sting balance with known weights resulting in loads and torques of comparable magnitude to those experimentally measured. The maximum bias error of a set of five repeated known-load experiments is used as the measurement uncertainty for roll moment and lift. The relative and absolute (in parenthesis) uncertainties for lift coefficient and roll moment coefficient are computed to be 3.3% ($\Delta C_L=0.0268$) and 4.9% ($\Delta C_l=0.0015$), respectively.

FIG. 6 compares the measured lift force expressed as a nondimensional coefficient, $C_L$ as a function of angle of attack for the AR=1 and AR=1.5 plain rectangular wing in comparison to data from other studies. Experiments were conducted at similar Reynolds numbers in the range 7.0-7.6×10$^4$. The wing model of Mueller and Torres had a thickness-to-chord ratio of 1.9% with 5:1 elliptical leading- and 10:1 elliptical trailing-edge geometry where the wing models of Mizoguchi and Itoh had a thickness-to-chord ratio of 3.3% with a rounded leading edge and square trailing edge. Good agreement is seen between experiments. The largest discrepancies occur at angles of attack near stall which is likely caused by different mounted mechanisms (mounting from the rear as in Mizoguchi and Itoh and the current study versus mounting from the side as in the Mueller and Torres study), differing leading-edge and trailing-edge profiles and thickness ratios, and experimental flow conditions.

Surface-Oil Flow Visualization

Various features of lift structures 150 having one or more alula 150 secured thereto are illustrated using surface-oil flow visualizations. For example, FIGS. 7A and 7B show results of surface-oil flow visualizations for lift structures 150 that are rectangular AR=1, 1.5, and 2.73 wings with and without the alula at a wide range of angles of attack in an effort to elucidate the aerodynamic mechanisms of the alula across various operating conditions. For each experiment surface patterns were retrieved for both single and dual alula configurations at a fixed orientation and position, y/(b/2)=−0.25 (single LO alula case), and |y/(b/2)|=0.25 (dual alula case).

The mixture used consisted of paraffin oil and commercially available fluorescent pigment (Art 'N Glow pigment powder, particle size 30-50 μm). The procedure was employed to generate the visualizations of FIGS. 7A and 7B is as follows. First, the wing is set to zero pitch angle using the robotic positioning system. Then, using a finely bristled brush, a heavily saturated pigment oil mixture is applied to wing with strokes having 50% overlap. Next, the saturated layer is tipped off using a coarse bristled brush that is wetted with pure paraffin oil. This step evens out the pigment on the wing and forms a thick layer suitable for pigment transport. The pigment on the wing surfaces is then charged using a UV flashlight to verify that a uniform distribution of pigment exists over the wing. Next, the MPS is commanded to the desired pitch angle and the tunnel velocity is rapidly ramped up to the prescribed freestream velocity. After >5 min of run time, the pigment is recharged and the wing is imaged at inclination with the lights turned off and tunnel still running. Lastly, images are dewarped and enhanced. An example pre and post processed image are shown in FIGS. 7A and 7B, where FIG. 7A shows a raw image and FIG. 7B shows a processed image.

Effect of the Alula Positional, Geometrical, and Orientation Parameters

In various embodiments, the spanwise position (e.g., y) of the alula along the front edge of the lift surface 150 changes the affect of the alula on the magnitude of control forces across the flight envelope. FIGS. 8A-8C illustrate the geometry configuration and the results of affixing a pair of alulas at various spanwise locations, |y/(b/2)|, symmetrically along a AR=1.5 wing or lift structure 150. The left and right wing semispans share reflective symmetry about the midspan of the wing. For these experiments, the alulae are hinged at the specified |y/(b/2)| location and are rotated/deflected $\varphi=25°$ from the wing plane as measured clockwise (counterclockwise) for the left (right) alula. The alula inclination angle for each alula is fixed at $\gamma=20°$.

Alula Spanwise Position

FIG. 8B compares lift curves of the wing with alulae placed at various spanwise locations, |y/(b/2)| for the geometry configuration shown in FIG. 8A. The baseline case represents the lift curve of the wing without alulae. The spanwise location of the alulae has a significant influence on the aerodynamics of the wing most notably at high angles of attack near that of lift stall for the baseline wing. The effect of the alula at all spanwise locations is to attenuate the initial lift peak of the baseline wing while increasing lift at post-stall angles of attack.

FIG. 8C plots the percent increase in lift due to alulae over the baseline wing as a function of the spanwise location of the alulae at select pre-stall and post-stall angles of attack. $\alpha=18°$ represents a pre-stall angle of attack, $\alpha=22°$ represents that of stall as indicated by $$\alpha_{C_{L_{max}}}$$

of the baseline wing, and $\alpha=28°$ represents a post-stall angle of attack. A maximum approximately 25% increase in post-stall lift occurs when the alulae are located at the center of the wing in a V configuration (see FIG. 9). This comes at the cost of a 3% reduction in the lift peak of the baseline wing. From FIG. 8C locating the alulae toward the wing tips degrades the performance benefit of the alulae. For example, spacing the alulae a distance 0.25b away from the midspan of the wing results in a 10% reduction in post-stall lift enhancement and a 10% decrease in pre-stall lift over the maximum-lift case.

In various embodiments, an alula secured to a lift structure 150 may be used to produce roll moments when the lift structure 150 is traveling at high angles of attack. Here, a single LO alula is fixed to the leading edge of the wing, where the orientation of the alula is fixed at $\varphi=25°$ and $\gamma=20°$, and length of the alula held at 0.15b. The location y of the alula root was varied on the left semispan of the wing from $y/(b/2)=-0.75$ to $y/(b/2)=0$. FIG. 10B compares lift coefficient curves and FIG. 10C compares roll moment coefficient curves of the wing with the alula placed at various spanwise locations, $y/(b/2)$. FIG. 10A shows the geometry of the configuration corresponding to FIGS. 10B and 10C.

From FIG. 10C, the roll moment produced by the baseline wing (wing with no alula) is approximately zero at all angles of attack. This is to be expected due to the symmetric flight condition (i.e. no sideslip). The addition of a single alula breaks this symmetry. The LO alula placed on the left semispan of the wing generates a positive roll moment of magnitude proportional to the distance of the alula from the wing's side edge. The maximum roll moment occurs with the alula root centered on the wing, $y/(b/2)=0$. This result is counter intuitive if one anticipates the alula to act like a leading-edge control surface where increasing the distance of the control surface from the wingtip decreases its moment arm. The alula is clearly not a conventional lifting surface. The maximum roll moment generated by the alula is $C_l=0.036$ which occurs at $\alpha=24°$. For comparison, the control force of a $-20°$ flap aileron deflection on an $AR=1.5$ wing at $\alpha=0°$ is $C_l=0.033$ (based on the data presented in FIG. 2). The miniature alula produces a control force at high angles of attack of greater magnitude than a flap aileron at zero angle of attack. Note that for the reference case, the wetted area of the flap aileron is $A_\alpha \approx 0.12S$, where S is the wing area. For comparison, the wetted area of the alula is $A_\alpha = 0.04S$, one-third that of the flap aileron.

The wing with an alula 155 generates a roll moment only at a distinct angle of attack range beginning at $\alpha=16°$ and ending at an angle of attack around 40°. This angle of attack range (approximately 16° to approximately 40°) is hereafter referred to as the operational angle of attack range of the alula. The roll moment curve is characterized by an initial increase in roll moment magnitude beginning at $\alpha=16°$ which plateaus or rolls off beginning at $\alpha=20°$. For the $y/(b/2)=-0.25$ through $y/(b/2)=-0.75$ cases, at initial angles of attack greater than $\alpha=20°$, the nonzero roll moment is sustained over a range of angle of attack until $\alpha \approx 30°$ above which the magnitude of roll moment decreases with increasing angle of attack. In contrast, for the $y/(b/2)=0$ case the roll moment peaks at $\alpha \approx 24°$. The trends in terms of roll moment and angle of attack associated with the alula, namely the increase in roll moment, subsequent plateau/peak, and reduction of roll moment, will be a recurring signature of the alula.

Notice that when comparing trends in roll moment and lift curves, FIG. 10b and FIG. 10c, respectively, changes in roll moment over the baseline wing do not necessary correlate with changes in lift. At initial angles of attack within the operational range of the alula, i.e. $\alpha=16-22°$ the single alula generates a positive roll moment which is accompanied by a loss of lift over the baseline wing. At higher angles of attack $\alpha>22°$ a positive roll moment is accompanied by an increase in lift over the baseline case. This suggests that the alula may only be a viable control effector at post-stall angles of attack for this wing. Surface-oil visualizations presented later in the manuscript will shed light on these curious trends.

Alula Span Length

FIG. 11 presents lift and roll moment coefficient data plotted as a function of angle of attack for the wing with a single LO alula placed at the midspan of the wing, $y/(b/2)=0$. The alula orientation is the same as the previous experiments, i.e. $\phi=25°$, $\gamma=20°$. For this experiment the length of the alula l was varied from 0.05b to 0.15b. The baseline case represents the plain wing with no alula attachment.

From FIG. 11b, increasing the length of the alula increases the magnitude of post-stall lift enhancement with having limited effect on pre-stall lift loss associated with the alula. With regards to roll moment, FIG. 11c, the effect of increasing the alula length is to increase the operational angle of attack range of the alula while having minor influence on the peak magnitude of roll moment. The geometry of the configuration corresponding to FIGS. 11b and 11c is shown in FIG. 11a. For example, for the smallest alula tested, the operational range of the alula is from $\alpha=16°-28°$ where for the largest tested span length the operational range of the alula is from $\alpha=16°-38°$. A longer alula would thus be favorable for control purposes in order to increase the operational range of the alula.

Alula Orientation

In various embodiments, the orientation of an alula 155 may influence various forces experienced by a lift structure 150 to which the alula 155 is secured. FIGS. 12A-12C show the geometry and results of placing a RO alula at the midspan of the wing with the span length of the alula was held at l=0.15b. The incidence angle of the alula was fixed at $\gamma=20°$.

FIGS. 12B and 12C display the effect of alula deflection on the lift coefficient and roll moment coefficient curves. FIG. 12A shows the geometry of the configuration corresponding to FIGS. 12B and 12C. In all cases the RO alula produces a negative roll moment (in contrast to the positive roll moment generated for the LO alula). The magnitude of roll moment is equal and opposite to a LO alula with the same root location which emphasizes the reflective symmetry of the alula about the midspan of the wing.

For angles from $\phi=5-25°$, the effect of alula deflection is similar to increasing the span length of the alula; increasing alula deflection increases post-stall lift enhancement with limited effect on prestall lift, FIG. 12B, and increases the upward limit of the operational angle of attack range of the alula, FIG. 12C. For example for $\phi=5°$ the operational range of the alula is from $\alpha=16°-30°$ where for $\phi=25°$ the operational range of the alula is from $\alpha=16°-38°$. However, in contrast to the span-length testing, increasing the deflection angle from $\phi=5-25°$ also increases the peak roll moment and lift at post-stall angles of attack. For the highest tested alula deflection $\phi=35°$ the trend is reversed where the peak roll moment and post-stall lift for $\phi=35°$ is less than that at $\phi=25°$. It appears that there exists an optimum alula deflection angle between $\phi=25°$ and $\phi=35°$ that maximizes post-stall control forces on this wing.

FIGS. 13B and FIG. 13C, display the effect of the alula incidence angle on the lift coefficient and roll moment coefficient curves. FIG. 13A shows the geometry of the configuration corresponding to FIGS. 13B and 13C. The deflection angle was held at $\varphi=30°$ and alula root was fixed at the midspan of the wing. In comparison to the other parameters of the alula, changing the incidence angle has a minimal effect on control forces at all tested angles of attack.

As shown in FIGS. 12B, 12C, 13B, and 13C, changing the location of the alula (e.g., translating the alula 155 along at least a portion of the span of the lift structure) enables a variable control force over a wide range of angles of attack; a feature not observed when varying the the deflection angle ϕ of the alula 155.

Effect of Wing Geometry on Alula Performance

FIG. 14 illustrates the affect of one or more alulas 155 secured to lift structures 150 of various geometries. For all reported experimental data presented hereafter, the alula orientation was kept fixed at ϕ=25°, γ=20° and the span of the alula and aspect ratio of the alula was kept at 0.15b. Experimental force measurements were taken on each wing with both dual and single alula.

FIG. 14 displays the results for both the single and dual alula experiments conducted on the rectangular wings of various aspect ratio. The figure is organized as follows. Dual and single alula cases are organized in the left and right columns respectively. Each row designates one of four position of the alula, y/(b/2)=−0.75, −0.5, −0.25, 0 where y/(b/2)=−0.75 corresponds to the alula position nearest to wing tips (topmost row) and y/(b/2)=0 is at the midspan of the wing (bottommost row). For the dual alula cases, the alula are placed symmetrically about the midspan of the wing, i.e. |y/(b/2)|, such that the alula orientations and positions on the right semispan mirror that of the left semispan. Due to the symmetry of this configuration, the dual alula cases mainly influence the longitudinal aerodynamics of the wing and has negligible influence on roll moment. This contrasts with the single alula case which influences both the longitudinal and lateral aerodynamics. Therefore, for both the dual and single alula cases, lift is plotted in black for each AR wing tested. For the single alula tests, i.e. right column, roll moment coefficient measurements are included in red. Here, roll moment coefficient measurements are multiplied by ten in order to use a single scale. For all figures, solid lines correspond to the wing with alula and the dotted line corresponds to the plain wing (no alula). Shaded regions highlight angle of attack regions for which a positive difference exists between the alula and plain wing case indicating that the alula increase lift or increases the magnitude of positive roll moment in that angle of attack range.

Results of the dual alula case are first interpreted (left column, FIG. 14). For each spanwise location of the alula two results can be concluded. First the operational angle of attack range of the alula is nearly independent of the wing aspect ratio. The alula effects the measured forces and moments on each wing at angles of attack in the range α=16°-40° for the AR=1/1.5 wings and α=16°-46° for the AR=2.73 wing. Second, the influence of the alula on the forces and moments measured on the wing depends on whether the operational angle of attack range of the alula encompasses angles of attack for which the lift of the baseline wing is stalled, as is the case for the AR=2.73 wing, or unstalled, as is the case for the AR=1 wing. The AR=1.5 exhibits a combination of both where the operational angle of attack range of the alula encompasses angles of attack of increasing and stalled lift. Therefore, while the aspect ratio is not a significant parameter in terms of the operational range of the alula, the aspect ratio plays a role in dictating how the alula will effect the wings aerodynamics. If the wing is stalled, i.e. a high aspect ratio wing, the effect of the dual alula configuration is to increase lift over the plain wing. In contrast if the wing is unstalled, such as the case for a low-aspect-ratio wing, the dominant effect of the alula is to reduce lift over the plain wing. These results are independent of the position of the alula.

The location of the dual alulae, influences the magnitude of either lift enhancement or lift reduction. The AR=1.5 wing experiences an attenuation of the initial lift peak followed by poststall lift enhancement due to the alula. The lift enhancement in the poststall regime increases as the alulae are placed further from the wing tips. A maximum 24.8% increase in lift occurs at α=24° with the dual alula placed at the midspan, y/(b/2)=0, which is accommodated by a 17.8% increase in drag. Much like the AR=1.5 wing, the AR=2.73 wing experiences lift enhancement due to the alula that increases with increasing distance from the wing tip, however, only for spanwise positions in the range |y/(b/2)|=0-0.75. A maximum 24.3% increase in lift occurs at α=28° with the dual alula placed at, y/(b/2)=−0.25. This comes with a 14.3% increase in drag. At |y/(b/2)|=0 the peak magnitude of lift enhancement is reduced over the |y/(b/2)|=−0.25 case and a large variation in lift enhancement occurs over relatively small changes in angle of attack. For the AR=1 wing the operational range occurs at angles of attack of increasing lift for this wing and for all tested spanwise locations of the alula, the effect of the dual alula configuration is to reduce lift over the plain wing. The reduction in lift occurs due to premature lift stall and a reduction in the lift peak for all spanwise locations of the alula. An exception is the |y/(b/2)|=0.25 case where $C_{L_{max}}$ is near similar to the plain wing case despite the reduction in lift at angles of attack immediately below and above this value.

Attention is now turned to the single alula results, (right column, FIG. 14). The single alula effects lift in a similar manner to the dual alula cases, however, the change in lift is always smaller than the corresponding dual alula case. The key effect of the asymmetric single alula configuration is the generation of a nonzero roll moment at angles of attack in the operational range of the alula; α=16°-40° for the AR=1 and AR=1.5 wings and α=16°-46° for the AR=2.73 wing. Again changing the wing aspect ratio has little effect on the operational angle of attack range of the alula. Unlike desperate trends in terms of lift enhancement vs lift reduction for wings of various aspect ratio, changes in roll moment share similar characteristics across the different aspect ratio wings; an initial increase in roll moment at α=16°, a roll moment plateau beginning at α=20°, followed by a reduction of roll moment beginning around α=30°. Interestingly, these trends in roll moment due to the alula occur irregardless of whether the lift of the baseline wing is stalled and may be accompanied by lift enhancement or lift reduction depending on the angle of attack.

FIGS. 15A and 15B are presented to better depict the trends in maximum values of roll moment with respect to alula position and wing aspect ratio. FIG. 15A displays the effect of alula spanwise location on the maximum roll moment coefficient for the various aspect ratio wings. The effect of spanwise position of the single alula on roll moment generation is such that increasing the distance of the alula from the wingtip increases the magnitude of nonzero roll moment for all wings. The exception to this statement is the AR=2.73 wing where the maximum roll moment is generated with the alula at y/(b/2)=−0.25. The maximum roll moment occurs with the hinge of the alula centered on the wing, y/(b/2)=0, for the AR=1 and AR=1.5 wing ($C_l$=0.020 at α=26° and $C_l$=0.036 at α=24°, respectively), and with the alula at y/(b/2)=−0.25 for the AR=2.73 wing ($C_l$=0.034 at α=30°). FIG. 15B plots the corresponding percent change in lift over the plain wing at the angle of attack of peak roll moment. For the AR=1.5 and AR=2.73 the peak roll moment is accompanied by a positive increment in lift for all spanwise locations of the alula. In contrast for the AR=1 wing, the peak roll moment at a given spanwise location of the alula is accompanied by a reduction in lift for spanwise locations y/(b/2)=−0.75--−0.25 where a net slight lift increase accompanies the peak roll moment y/(b/2)=0.

FIGS. 16A-B show the high-lift benefit of the alula when the lift structure 150 comprises swept wings. For these wings the aspect ratio was fixed at 2.73 where sweep angles varied from $\Lambda=0°, 15°, 30°, 40°$. The alula parameters were kept the same. Note that the alula was oriented parallel to the swept leading-edge.

FIGS. 16A and 16B plot the maximum change in roll moment coefficient and the corresponding change in lift as a function of alula spanwise location for various sweep angled wings with a single alula. From FIG. 16A, the change roll moment due to the alula on swept wings is only substantial for the tested wings of low sweep angles $\Lambda \leq 15°$ as the maximum roll moment for all tested spanwise locations of the alula drops substantially for the swept wings $\Lambda > 15°$. These results suggest that the alula may only be an effective at controlling roll moments on wings with low sweep angles $\Lambda \leq 15°$. Interestingly, while the $\Lambda=15°$ wing experiences a near equivalent maximum roll moment as the unswept wing $\Lambda=0°$, the roll moment is accompanied by a lift increase that is 32% less than the unswept wing.

Also included in FIGS. 16A and 16B are the results for the heavily tapered wings, $\lambda=0.1$ of sweep angle $\Lambda=0°$ and $\Lambda=40°$ each of AR=2.73. The maximum roll moment for the unswept tapered wing, while less than that of the untapered wings of low sweep angle, is still significantly larger than the tested wings of high sweep $\Lambda > 15°$. The swept tapered wing which is representative of a delta wing, experiences a steep reduction in change in force relative to the unswept tapered wing. These results suggest that the alula may be a viable control effector on tapered wings so long as the sweep angle remains small.

Surface-Oil Visualizations

We employ the surface-oil technique to illustrate two main relationships: 1. the relationship between angle of attack, wing geometry, and alula lateral control and longitudinal performance. 2. the relationship between alula position and lateral control.

Effect of Angle of Attack

FIG. 17 displays the effect of angle of attack on lift, drag, pitching, and roll moment coefficients of the AR=1.5 wing with single, double, and no alula. The top left figure plots lift coefficient, $C_L$, as markers with dashed lines and ten times the rolling moment coefficient, $10C_l$, as markers with solid lines. The top right figure plots the negative of the quarter chord pitching moment coefficient, $C_M$, as markers with solid lines and the drag coefficient, $C_D$, as markers with dashed lines. Here, increases along the y-axis correspond to an increase in nose down pitching moment. Also included are surface-oil visualizations of the AR=1.5 wing with single, dual, and no alula at angles of attack as marked.

First, we discuss the surface patterns on the plain wing. At $\alpha=10°$ the surface patterns suggest the presence of a short bubble near the leading-edge of the wing. At $\alpha=15°$ the short bubble remains near the wing tips but a distinct isolated dual lobed surface pattern is observed near the midspan of the wing. At the angle of attack of maximum lift, $\alpha=20°$, the dual lobed surface pattern has shifted aft and grown in spacial extent. The authors suggest that this structure contributes to the distinct lift peak in the lift curve for this wing. At $\alpha>25°$, this surface pattern is lost, indicating that the flow over the wing is massively separated. Here, force and moment measurements depict a decrease in lift, drag, and nose down pitching moment.

Attention is now turned to the surface patterns on wings affixed with both a single and dual alula. At low angles of attack, $\alpha=10$-$15°$, the differences between the surface patterns with the alula and without are minimal. At $\alpha \geq 20°$ curious surface patterns are observed near the upstream corners of the wing with the alula specifically at spanwise stations between the alula root and the wing tip. Specifically, dark regions indicating flow reattachment sweep from the alula root toward the wing tip in a manner dependent on the angle of attack. At a given angle of attack, these surface patterns are similar for the single and dual alula cases and are not observed on the plain wing. Thus, we attribute these surface patterns to the presence of the alula and hypothesize that the dark reattachment lines which sweep from the alula root toward the wing tip are the surface footprint of an alula vortex. Note that this depiction of a sweeping vortex is very different from the streamwise vortex proposed in Lee, S. and Choi, H., "Characteristics of the alula in relation to wing and body size in the Laridae and Sternidae," Animal Cells and Systems, Vol. 21, No. 1, 2017, pp. 63-69.

FIG. 18 provides a zoomed-in view of the surface patterns associated with the alula specifically for the single alula case. Note that these patterns are observed for the dual alula case as well with little distinction. At $\alpha=20°$ two reattachment lines exist as marked. Running nearly parallel to the wing tip is the reattachment line associated with the tip vortex. Sweeping from the root of the alula toward the wing tip is the reattachment line associated with the alula vortex. Here, the reattachment line associated with the alula vortex terminates before reaching the wing tip splitting off to form a distinct half moon surface pattern. At $25°<\alpha<40°$ this half moon shape is lost and a continuous reattachment line associated with the alula vortex is observed on the wing stemming from alula root and extending toward wing tip. At $\alpha=40°$, the surface patterns associated with the alula vortex are lost.

In various embodiments, from $\alpha=20°$ to $\alpha=25°$ the alula has generated sufficient spanwise flow to permit the penetration of the alula vortex into the wing tip flow. Here, spanwise flow is generated by the canted alula in a similar manner to that of a lifting surface that is inclined to the freestream and at a nonzero roll angle experiences a component of the freestream velocity along its span. The magnitude of this spanwise flow increases with increasing angle of attack. The surface patterns at $\alpha=25°$ and $\alpha=30°$, depict sharp and distinguished dark regions above the reattachment line indicating the low pressure surface footprint of the alula vortex. Increases in angle of attack $\alpha>30°$ display more faded reattachment lines which is likely a consequence of the alula vortex lifting off the wing surface at these high angles of attack.

The surface patterns suggest that the sweeping alula vortex is a major driver of the observed changes in forces and moments at angles of attack in the range $\alpha=16$-$40°$. The positive roll moment measured on the single alula case from $\alpha=20$-$40°$ is consistent with the alula vortex reattaching otherwise separated flow on the portion of the left wing outboard of the alula. Moreover, the reduction in roll moment at $\alpha>30°$ is attributed to the lift off of the alula vortex. However, despite the ability of the alula to reattach otherwise separated flow near the corners of the wing, global lift enhancement is only observed at high angles of attack involving massively separated flows, $\alpha=24$-$40°$. In this angle of attack range lift is accompanied by an increase in drag with pitching moment negligibly effected for both the single and dual alula cases. In contrast, at lower angles of attack in the range $\alpha=16\text{-}22°$, global lift, drag, and pitching moment is reduced for the wings with the alula. For example, at $\alpha=20°$ the wing with dual (single) alula experiences a 15.8% (15.4%) decrease in lift, a 14.7% (10.1%) decrease in drag, and a 44.1% (26.9%) decrease in nose down pitching moment over the plain wing. Surface patterns of the wings with the alula at $\alpha=20°$ depict the clear elimination and/or disruption of the distinct surface pattern attributed to the arch-type vortex seen on the plain wing. Thus the detrimental effects of the alula on global forces and moments at $\alpha=16\text{-}22°$ is associated with the elimination or interference of the alula induced flow with the 3D high-lift mechanisms of the LAR wing.

FIG. 19 displays the effect of angle of attack on lift, drag, pitching, and roll moment coefficients of the AR=1 wing with single, double, and no alula. Also included are surface-oil visualizations at select angles of attack. Unlike the AR=1.5 wing where the operational angle of attack range of the alula, $\alpha=16\text{-}40°$, encompasses angles of attack of both increasing and stalled lift, for the AR=1 plain wing, the operational range of the alula consists largely of angles of attack of increasing lift for the plain wing.

Surface patterns are analyzed on the plain AR=1 wing first. At low angles of attack, $\alpha=10\text{-}20°$, similar results as the AR=1.5 wing are observed; a short bubble near the leading-edge at the lower angle of attack, the presence of an isolated dual lobed structure at the moderate angle of attack, and its spacial expansion and downstream shift on the wing at the higher angle of attack. In this case, this flow structure, as well as that which is seen on the AR=1.5 wing, occurs at an angle of attack of increasing lift. Returning to the surface patterns on the plain wing AR=1 wing, at $\alpha>20°$, the lobe structure unravels with legs extending outboard toward the wing tips. In addition, the gap between the lobe regions widens with the connecting region becoming more clearly defined and the regions of high shear (dark regions on the wing) becoming less pronounced. Quantitative imaging of the AR=1 wing in streamwise measurement planes spanning the wing at these angles of attack reveal strong re-circulatory flow above the wing. As such, the surface patterns on the wing provide indication of the upstream penetration of reverse flow on the wing. At $\alpha=40°$, the wing has stalled and this distinct surface structure is lost.

Attention is now turned to the alula-induced surface patterns near the leading-edge of the AR=1 wing. Similar to the AR=1.5 wing case, at low angles of attack, $\alpha=10\text{-}15°$, the differences between the surface patterns with the alula and without are minimal. At $\alpha=20\text{-}25°$ the reattachment lines, which begin at the alula root, do not extend all the way to the wing tip but stop short. At higher angles of attack $\alpha \geq 30°$, the alula induced surface patterns follow similar trends as the AR=1.5 wing; a single reattachment line is observed which sweeps from the alula root toward the wing tips. These features fade slightly with increasing angle of attack and are eventually completely gone at $\alpha=40°$. As in the AR=1.5 case, for the AR=1 wing the effect of the alula is not isolated to regions between the alula and the wing tip. The presence of the alula results in the distortion of the 3D flow structures over the plain wing most notable at $\alpha \geq 15°$. For the dual alula case $\alpha=20°$, the distinct surface pattern on the plain wing is compacted to the midspan of the wing. At higher angles of attack, the legs of the unraveled lobe structure on the surface of the wing with dual alula connects to the wing tip further downstream than that which occurs on the plain wing, specifically at the wings trailing edge. A distinct continuous arch is observed on the wing at $\alpha=30°$, which differs from the kinked arch on the plain wing. This angle of attack, $\alpha=30°$, corresponds to the maximum reduction in lift (7.7%), drag (8.8%) and nose down pitching moment (11.3%) over the plain wing. At $\alpha \geq 35°$, the distinctions between the plain wing and the dual alula surface patterns become less pronounced which is consistent with minor changes in forces and moments associated with the dual alula at these angles of attack.

In contrast to the variation in lift, drag, and pitching moment for the dual alula case, for the single alula case the variation in lift, drag, and nose down pitching moment is near negligible. Despite this, the single alula case still produces a roll moment. These trends stem from a combination of the alula vortex reattaching otherwise separated flow near the wing corners while shifting and causing a slight distortion of the 3D structures over the plain wing. At $\alpha=20°$ the dual lobed structure is shifted toward the right wing with the spacing between the lobes increased. At $\alpha=25°$, the unraveled lobe structure is also asymmetric on the wing and mimics a combination of the dual and plain wing surface patterns; the right leg connects to the wing tip at around the three-quarter chord point similar to the plain wing where the left leg extends further downstream on the wing in a manner similar to the dual alula case. At the higher angles of attack $\alpha>25°$, the asymmetries associated with the single alula are reduced.

Attention is now turned to the experiments conducted on the AR=2.73 wing. FIG. 20 displays the force and moment curves and corresponding surface patterns for select angles of attack. Here the operational angle of attack range of the alula is $\alpha=16\text{-}46°$ which occurs at angles of attack for which lift has stalled for the plain wing. The presence of the alula increases lift throughout this operational angle of attack range. Lift increases are accompanied with increases in drag where pitching moment is minimally effected. For the single alula case, increases in lift are accompanied by an increase in roll moment.

Surface patterns outboard of the alula depict similar trends are observed on the lower aspect ratio wings. Distinct reattachment lines associated with an alula vortex sweep from the alula root toward the wing tips, terminating just short of the wing tip at $\alpha=20°$. At $\alpha=30°$, a maximum change in both lift, drag, and roll moment occurs for the dual and single alula cases. Here, surface patterns depict sharp distinct reattachment lines which extend all the way to the wing tips from the alula root. At higher angles of attack, $\alpha>30°$, the reattachment lines fade and the change in forces and moments due to the alula is reduced, suggesting the lift off of the alula vortex from the wing plane.

Effect of Spanwise Position of Alula

FIGS. 21A, 21B, and 21C depict the surface patterns on the baseline wing at $\alpha=25°$ compared to the wing affixed with dual alulae at $|y/(b/2)|=0.25$ and $|y/(b/2)|=0$. The surface patterns on the baseline wing at this angle of attack, FIG. 20a, are absent of distinct surface patterns associated with flow reattachment, except for limited regions near the trailing-edge, suggesting that the flow over the baseline wing is massively separated over the majority of the lifting surface. In contrast, the surface patterns for both dual alulae cases, FIG. 20b and FIG. 20c, reveal two distinct reattachment lines originating from the alula root and sweeping outboard toward the wing tips. These surface patterns in conjunction with load measurements, which indicate lift enhancement associated with the dual alulae at this angle of attack (e.g. ~20% for the dual alula at $|y/(b/2)|=0.25$), suggest that the control force of the alula is associated with its ability to reattach otherwise separated flow over substantial portions of the wing.

Surface patterns were also obtained with a single LO alula placed at seven different locations across the span of the wing at α=25°. FIG. 22 displays the effect of the alula spanwise location on surface flow patterns. Also included are corresponding measurements of the change in lift and roll moment coefficient over the baseline wing (plain wing) as a function of alula spanwise location. Again, the surface patterns on the plain wing indicate the flow is massively separated at this angle of attack except at limited regions at the midspan of the wing near the trailing edge. The surface patterns of the wing with the alula show that as the alula is positioned further from the left wing tip at spanwise positions in the range, y/(b/2)=−0.75-0.25, the reattachment line originating from the alula root sweeps further across the wing toward the wing tip. From FIG. 22A, the change in lift increases exponentially with increasing distance from the left wing tip and reaches a maximum value of 0.09 at y/(b/2)=0.25 which corresponds to a 12.7% increase in lift over the baseline wing at this angle of attack. For this set of alula locations, roll moment increases monotonically with increasing distance of the alula from the wing tip reaching a maximum value at y/(b/2)=0.

These surfaces patterns in conjunction with load measurements suggest that the lift-optimal spanwise location for the alula occurs at the furthest distance away from the wing tip for which the sweeping nature of the reattachment line is still retained. Similarly, the maximum roll moment is obtained when the alula is placed at the furthest distance from the wing tip for which the sweeping nature of the alula reattachment line is still retained unless this distance is greater than the semispan of the wing, b/2. For the latter case, the maximum roll moment is obtained by placing the alula at the midspan of the wing.

At spanwise locations y/(b/2)>0.25 the sweeping reattachment line is lost. Force measurements indicate a net positive increase in lift, for example at y/(b/2)=0.5 the lift coefficient increases by 6.3% from the plain wing, which is accompanied by a slight negative roll moment. Dark regions are seen downstream of the alula skewing slightly toward the right wing tip which suggests flow reattachment there. The existence of reattached flow on the right wing and separated flow on the left wing is consistent with the negative roll moment measured for the y/(b/2)>0.25 cases.

Ultimately, the surface patterns in conjunction with force and moment measurements paint a consistent picture of how the alula influences the wing aerodynamics. At a specific angle of attack range, the alula generates sweeping vortex that reattaches otherwise separated flow at spanwise stations outboard of the alula. Despite this action, global lift is only increased if the flow over the wing is massively separated. Else, the sweeping vortex can distort or even eliminate 3D high-lift structures inherent to the wing itself resulting in a global reduction in lift. The spanwise location of the alula plays a critical role in dictating the magnitude of lift and roll moment increments associated with the alula. It appears that the spanwise location of the alula controls the length of the sweeping alula vortex and thus the percentage of reattached flow over the wing. Care must be taken, however, not to place the alula too far away from the wing's side edge as the sweeping nature of the alula vortex can be lost which can reduce the high-lift benefit of the alula.

FIGS. 23A, 23B, and 23C depict schematics of a vehicle 100 (e.g., a MAV) with sliding alulae 155. It is assumed that the MAV is trimmed at an angle of attack involving massively separated flow in the operational angle of attack range of the alula 155. At trim, FIG. 23A, the alulae 155 are symmetrically placed at spanwise locations which allow sufficient inboard travel of the alula 155 without loss of the sweeping alula vortex. About this trim condition, lift can be controlled by the symmetric inboard/outboard movement of the alula 155, FIG. 23B. Here, inboard motion of the alula 155 increases lift as a the alula vortex sweeps over larger portions of the wing reattaching otherwise separated flow over a larger percentage of the lift structure 150. The outboard motion of the alula 155 shortens the alula vortex travel over the lift structure 150 reducing lift. The magnitude of the change in lift is proportional to the alula 155 travel. The drawback of the sliding alula 155 for lift control is the parallel variation of drag.

More intriguing than the sliding alula 155 for lift control, is the sliding alula 155 for roll control (see FIG. 23C). To control roll moment, synchronized shifting of the alula 155 to the left (right) on the lift structure 150 generates a negative (positive) roll moment of magnitude proportional to the shift. For example, shifting the alula 155 to the right extends the length of the sweeping alula vortex on the left semispan while reducing the length of the sweeping alula vortex on the right semispan. This produces an asymmetry in flow reattachment across the span of the lift structure 150 which favors a positive roll moment. As the percentage of the lift structure 150 experiencing reattached flow does not change with equal shifting of the alula 155, the total lift and drag on the wing will be little effected.

Control Authority of Sliding Alula in Sideslip

The turbulent environment can lead to asymmetric flows over the wing and control surfaces which generates undesired rolling moments and can potentially degrade control authority. Due to the low-aspect-ratio wings of MAVs, the magnitude of roll moments generated in sideslip are significantly larger than their higher aspect ratio counterparts. As used herein a low-aspect-ratio wing or lift structure 150 has an aspect ratio (e.g., ratio of the span to the chord of the wing or lift structure) that is approximately 3.0 or less. An MAV must have sufficient control authority to both trim the aircraft (low level control), i.e. reject undesired roll moments, and produce necessary control force for guidance (high level control). It is thus of interest to assess the roll control authority of the sliding alula 155 in sideslip for both these tasks. Preliminary experiments toward this end were conducted with the single alula 155 on the AR=1 and AR=1.5 wing in steady sideslip specifically at sideslip angles of β=−5° and β=−10°. To assess the ability of the alula 155 to reject undesired roll moments due to sideslip, the wing was first affixed with a leeward oriented (LO) alula 155 placed on the leeward semispan of the wing at spanwise stations from y/(b/2)=0.25 to y/(b/2)=0.75. Next, the wing was affixed with a windward oriented (WO) alula 155 placed on the windward wing at spanwise stations from y/(b/2)=−0.75 to y/(b/2)=−0.25 with the goal of assessing the ability of this alula configuration to produce an additional roll moment, atop of that generated due to sideslip, which would be useful for performing extreme maneuvers.

Roll moment measurements for the AR=1.5 wing are presented in FIG. 24; trends with regards to the alula in sideslip are largely representative of the AR=1 wing. The roll moment curve for the plain wing in sideslip is assessed first. For each sideslip angle, roll moment increases with angle of attack until α=18°. In comparing FIG. 24a and FIG. 24b, the magnitude of roll moment coefficient at a given angle of attack is larger for the higher sideslip angle. The following equation accurately captures these trends for low-aspect-ratio wings at low to moderate angles of attack:

$$C_l(\alpha) = (C_{l_\beta}/C_L) C_L(\alpha) \beta, \quad [1]$$

where, $C_{l_\beta}/C_L$, is the gust sensitivity parameter previously derived for low-AR straight wings defined by their sweep angle, aspect ratio, and taper ratio in Linehan, T. and Mohseni, K., "Theoretical prediction of roll moment due to sideslip for thin low-aspect-ratio wings," AIAA Journal, 2018, accepted. For rectangular wings $C_{l_\beta}/C_L = 3/(8AR)$. $C_L(\alpha)$ is given analytically for thin low-aspect-ratio rectangular wings by DeVoria, A. C. and Mohseni, K., "A vortex model for forces and moments on low-aspect-ratio wings in side-slip with experimental validation," Proceedings of the Royal Society A, Vol. 473, No. 2198, 2017, but may also be also obtained via the method of Lamar (Lamar, J. E., "Extension of leading-edge suction analogy to wings with separated flow around the side edges at subsonic speeds," Technical Report TR R-428, NASA, Langley Research Center, Hampton, Va., USA, July 1974) with little distinction. At $\alpha > 18°$ roll moment stalls and agreement with Equation 1 is lost as subsequent increases in angle of attack result in the reduction in the magnitude of roll moment.

The alula influences roll moments at $\alpha > 16°$ which consists largely of angles of attack in the roll stall regime for both the AR=1.5 and AR=1 wing. The dominant effect of the leeward oriented (LO) alula 155 placed on the leeward wing is to reduce the roll moment induced by sideslip by a magnitude proportional to its distance from the leeward wing tip. The opposite effect occurs for the windward oriented (WO) alula placed on the windward wing where the roll moment is increased by a magnitude proportional to its distance from the windward wing tip. Importantly, for the LO alula case there exists a spanwise location of the alula that completely negates the roll moment due to sideslip within the operational angle of attack range of the alula. For the wing at $\beta = -5°$, the roll moment at $\alpha = 25°$ is nearly eliminated by placing the alula at $y/(b/2) = 0.5$. This leaves additional control bandwidth for high level control. In contrast at the larger sideslip angle, $\beta = -10°$, the wing requires nearly all of the control bandwidth to reject the roll moment induced by the higher sideslip angle.

Atop the strong undesired roll moments generated by MAVs in sideslip and the potential for control saturation of the alula 155, an additional consequence of sideslip is the slight reduction the operation angle of attack range of the alula 155 specifically for the LO alula 155 placed on the leeward wing. For example the operation angle of attack range of the LO alula placed at $y/(b/2) = 0.25$ with the wing at $\beta = -5°$ is $\alpha = 18\text{-}36°$ where for the wing at $\beta = -10°$ the operational angle of attack range is reduced by six degrees to $\alpha = 18\text{-}30°$. This feature is likely linked to the stall progression on the AR=1.5 wing where stall initiates on the leeward wing in sideslip and progresses upstream toward the windward wing with increasing angle of attack likely disrupting the formation of the alula vortex and its associated effect on roll moment generation.

Thus, in various embodiments sliding alula are used for lift and roll control at high angles of attack, which entails coordinated shifting of two alulas 155 on the lift structure 150 (e.g., wing) to control i) the percentage of reattached flow on the wing (lift control) and ii) the asymmetry of flow reattachment on the wing (roll control). The control authority of the sliding alula 155 for the wing perturbed in sideslip was assessed through a series of experiments conducted on wings in steady sideslip. Control authority was largely retained in sideslip and it was shown that a leeward-oriented alula 155 placed on the leeward semispan of the wing has sufficient bandwidth to reject the roll moment induced by a 5 degree sideslip angle while leaving additional control bandwidth for additional maneuvering.

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A lift structure comprising:
   a leading surface of the lift structure and a trailing surface of the lift structure, a distance between the leading surface of the lift structure and the trailing surface of the lift structure defining a chord length of the lift structure, a width of the lift structure in a direction transverse to a direction from the trailing surface of the lift structure to the leading surface of the lift structure defining a span of the lift structure; and
   one or more alulas,
   wherein:
   a leading surface of each alula of the one or more alulas is either:
   flush with the leading surface of the lift structure, or
   offset from the leading edge of the lift surface by up to approximately 10% of the chord length of the lift structure,
   a length of each alula of the one or more alulas is no more than approximately 20% of the span of the lift structure, and
   at least one of the one or more alulas is moveable between a storage position defining a deflection of angle substantially equal to zero and an in-use position defining a deflection angle of at least 5°.

2. The lift structure of claim 1, wherein at least one alula of the one or more alulas is secured to the lift structure in a slidable manner.

3. The lift structure of claim 2, wherein the at least one alula is secured to an elongated member that extends along at least a portion of the lift structure, the at least one alula being secured to the elongated member such that the at least one alula is translatable along the elongated member in a controlled manner.

4. The lift structure of claim 3, further comprising a motor configured to control the translating of the alula along at least a portion of the elongated member.

5. The lift structure of claim 1, wherein the lift structure further comprises a linear actuator configured to move the at least one of one or more alulas between the storage position and the in-use position.

6. The lift structure of claim 5, wherein, when the at least one of the one or more alulas is actuated, the at least one of the one or more alulas has an incidence angle of approximately 5-35°.

7. The lift structure of claim 5, wherein, when the at least one of the one or more alulas is actuated, the at least one of the one or more alulas has a deflection angle of approximately 5-40°.

8. The lift structure of claim 1, wherein the one or more alulas each have a chord length of no more than approximately 20% of the chord length of the lift surface.

9. The lift structure of claim 1, wherein the lift structure is a low-aspect-ratio wing.

10. The lift structure of claim 1, wherein at least one alula of the one or more alulas is secured to the lift structure in a fixed manner.

11. A vehicle comprising:
a vehicle body; and
at least one lift structure coupled to the vehicle body, the at least one lift structure comprising:
a leading surface of the at least one lift structure and a trailing surface of the at least one lift structure, a distance between the leading surface of the at least one lift structure and the trailing surface of the at least one lift structure defining a chord length of the at least one lift structure, a width of the at least one lift structure in a direction transverse to a direction from the trailing surface of the at least one lift structure to the leading surface of the at least one lift structure defining a span of the at least one lift structure; and
one or more alulas,
wherein:
a leading surface of each alula of the one or more alulas is either:
flush with the leading surface of the at least one lift structure, or
offset from the leading edge of the at least one lift surface by up to approximately 10% of the chord length of the at least one lift structure,
a length of each alula of the one or more alulas is no more than approximately 20% of the span of the at least one lift structure, and
at least one of the one or more alulas is moveable between a storage position defining a deflection of angle substantially equal to zero and an in-use position defining a deflection angle of at least 5°.

12. The vehicle of claim 11, wherein at least one of (a) the vehicle is a micro-aerial vehicle and the at least one lift structure is a low-aspect-ratio wing with the one or more alulas coupled thereto or (b) the vehicle is an underwater vehicle and the lift structure is a fin with the one or more alulas coupled thereto.

13. The vehicle of claim 11, wherein at least one alula of the one or more alulas is secured to the lift structure in a slidable manner.

14. The vehicle of claim 13, wherein the at least one alula is secured to an elongated member that extends along at least a portion of the at least one lift structure, the at least one alula secured to the elongated member such that the at least one alula is translatable along the elongated member in a controlled manner.

15. The vehicle of claim 14, further comprising a motor configured to control the translating of the alula along at least a portion of the elongated member.

16. The vehicle of claim 11, wherein the at least one lift structure further comprises a linear actuator configured to move the at least one of one or more alulas between the storage position and the in-use position.

17. The vehicle of claim 16, wherein, when the at least one of the one or more alulas is actuated, the at least one of the one or more alulas has at least one of (a) an incidence angle of approximately 5-35° or (b) a deflection angle of approximately 5-40°.

18. The vehicle of claim 11, wherein the one or more alulas each have a chord length of no more than approximately 20% of the chord length of the lift surface.

19. The vehicle of claim 11, wherein at least one alula of the one or more alulas is secured to the at least one lift structure in a fixed manner.

20. A method of operating a vehicle at a high angle of attack, wherein the method comprises the steps of:
determining via a computer processing element of the vehicle that the vehicle is operating at and/or is about to be operated at a high angle of attack, wherein the vehicle comprises:
a vehicle body having the computer processing element coupled thereto, and
at least one lift structure coupled to the vehicle body, the at least one lift structure comprising a leading surface of the at least one lift structure and a trailing surface of the at least one lift structure, a distance between the leading surface of the at least one lift structure and the trailing surface of the at least one lift structure defining a chord length of the at least one lift structure, a width of the at least one lift structure in a direction transverse to a direction from the trailing surface of the at least one lift structure to the leading surface of the at least one lift structure defining a span of the at least one lift structure; and
one or more alulas, wherein: (i) a leading surface of each alula of the one or more alulas is either: (a) flush with the leading surface of the at least one lift structure, or (b) offset from the leading edge of the at least one lift surface by up to approximately 10% of the chord length of the at least one lift structure, and (ii) a length of each alula of the one or more alulas is no more than approximately 20% of the span of the at least one lift structure, at least one of the one or more alulas is moveable between a storage position defining a deflection of angle substantially equal to zero and an in-use position defining a deflection angle of at least 5°; and
causing, by the computer processing element, the at least one of the one or more alulas to be moved from the storage position to the in-use position, such that, when in the in-use position, the at least one of the one or more alulas has at least one of (a) an incidence angle of approximately 5-35° or (b) a deflection angle of approximately 5-40°.

\* \* \* \* \*

UNITED STATES PATENT AND TRADEMARK OFFICE
CERTIFICATE OF CORRECTION

PATENT NO. : 11,332,245 B2
APPLICATION NO. : 16/709227
DATED : May 17, 2022
INVENTOR(S) : Mohseni et al.

It is certified that error appears in the above-identified patent and that said Letters Patent is hereby corrected as shown below:

In the Specification

<u>Column 1</u>
Lines 13-20:
"FEDERALLY SPONSORED RESEARCH OR DEVELOPMENT
This invention was made with government support under FA9550-17-1-0176 awarded by U.S. Air Force Office of Scientific Research (AFOSR) and 1805776 awarded by the National Science Foundation. The government has certain rights in the invention."
Should read:
--FEDERALLY SPONSORED RESEARCH OR DEVELOPMENT
This invention was made with government support under FA9550-17-1-0176 awarded by U.S. Air Force Office of Scientific Research (AFOSR) and 1805776 awarded by the National Science Foundation and N00014-18-1-2376 awarded by the U.S. Navy Office of Naval Research. The government has certain rights in the invention.--

Signed and Sealed this
Eleventh Day of October, 2022

*Katherine Kelly Vidal*
Katherine Kelly Vidal
*Director of the United States Patent and Trademark Office*